(12) United States Patent
Fukatsu et al.

(10) Patent No.: US 7,296,230 B2
(45) Date of Patent: Nov. 13, 2007

(54) LINKED CONTENTS BROWSING SUPPORT DEVICE, LINKED CONTENTS CONTINUOUS BROWSING SUPPORT DEVICE, AND METHOD AND PROGRAM THEREFOR, AND RECORDING MEDIUM THEREWITH

(75) Inventors: Shinji Fukatsu, Yokosuka (JP); Yoshinobu Tonomura, Yokohama (JP); Tsutomu Sasaki, Nagoya (JP); Akihito Akutsu, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 785 days.

(21) Appl. No.: 10/721,633

(22) Filed: Nov. 25, 2003

(65) Prior Publication Data

US 2004/0141016 A1  Jul. 22, 2004

(30) Foreign Application Priority Data

Nov. 29, 2002 (JP) ............................. 2002-347196
Jul. 7, 2003 (JP) ............................. 2003-271599

(51) Int. Cl.
*G06F 3/048* (2006.01)

(52) U.S. Cl. ...................... 715/711; 715/804; 715/806; 715/862

(58) Field of Classification Search ................ 715/804, 715/856, 862
See application file for complete search history.

(56) References Cited

U.S. PATENT DOCUMENTS 6,091,415 A    7/2000  Chang et al.
6,181,838 B1   1/2001  Knowlton
6,373,502 B1*  4/2002  Nielsen ...................... 715/708

(Continued)

FOREIGN PATENT DOCUMENTS

JP    06-282401    10/1994
JP    08-161138    6/1996
JP    09-138745    5/1997

(Continued)

OTHER PUBLICATIONS

"inlineLink Inline Expansion Link Methods in Hypertext Browsing", by Motoki Miura, Buntarou Shizuki and Jiro Tanaka, Proceedings of International Conference on Internet Computing (IC2001), Jun. 2001, vol. II, pp. 653-659.

(Continued)

*Primary Examiner*—Weilun Lo
*Assistant Examiner*—Kim-Lynn Dam
(74) *Attorney, Agent, or Firm*—Harness, Dickey & Pierce, P.L.C.

(57) ABSTRACT

Pop-up display information is created and displayed in a dynamic manner even without establishing settings in advance related to pop-up display for an anchor or an icon or the like, and implementing simple and efficient browsing by a user of linked contents by varying the display size in accordance with the display region. Mouse events of a mouse cursor upon a screen of an information device by the user are observed, and the fact that the mouse cursor has entered into a region of an object which has a linked destination is detected from the mouse events; a new window is displayed upon the screen; linked contents which are connected to the object are acquired; contents for presentation are created based upon the linked contents which have been acquired; and they are displayed within the new window which has been displayed upon the screen.

29 Claims, 20 Drawing Sheets

U.S. PATENT DOCUMENTS

| | | |
|---|---|---|
| 6,486,895 B1 | 11/2002 | Robertson et al. |
| 2002/0152222 A1 | 10/2002 | Holbrook |
| 2005/0235203 A1 | 10/2005 | Undasan |

FOREIGN PATENT DOCUMENTS

| | | |
|---|---|---|
| JP | 10-214172 | 8/1998 |
| JP | 10-333799 | 12/1998 |
| JP | 11-003201 | 1/1999 |
| JP | 2000-276471 | 10/2000 |
| JP | 2005-521130 | 7/2005 |
| WO | WO 01/55897 | 8/2001 |
| WO | WO-01-57643 | 8/2001 |

OTHER PUBLICATIONS

"Zero-Click: a system to support Web-browsing", by Tomoyuki Nanno, Suguru Saito, and Manabu Okumura, 63rd. Information Processing Society of Japan, Proceeding of the 60th National Convention, 2J-06, 2001.

"ForeScope: Browsing system for hierarchical contents", by Shinji Fukatsu, Akihito Acts, and Yoshinobu Tonomura, Information Processing Society of Japan, SIG-HI (Human Interface), pp. 1-6, Jan. 30-31, 2003.

"Foresight Scope: An interaction Tool for Quickly and Efficiently Browsing Linked Contents", by Shinji Fukatsu, Akihito Akutsu, and Yoshinobu Tonomura, Human Computer Interaction International, pp. 1-5, Jun. 22-27, 2003.

Stanyer D. et al: "Improving Web usability with the link lens", Computer Networks, Elsevier Science Publishers B.V., vol. 31 No. 11-16, May 17, 1999, pp. 1533-1544.

Kopetzky T., et al: "Visual preview for link traversal on the World Wide Web", Computer Networks, Elsevier Science Publishers B.V., vol. 31, No. 11-16, May 17, 1999, pp. 1525-1532.

Weinrich H. et al: "Concepts for improved visualization of Web link attributes", Computer Networks, Elsevier Science Publishers B.V., vol. 33, No. 1-6, Jun. 2000, pp. 403-416.

* cited by examiner

FIG. 1A  SCREEN PRESENTED TO USER
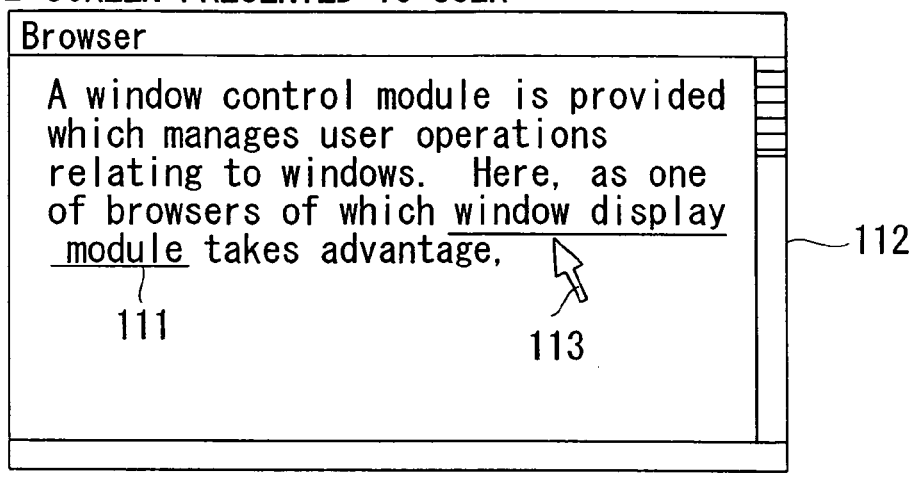
FIG. 1B  POP-UP WINDOW DISPLAY
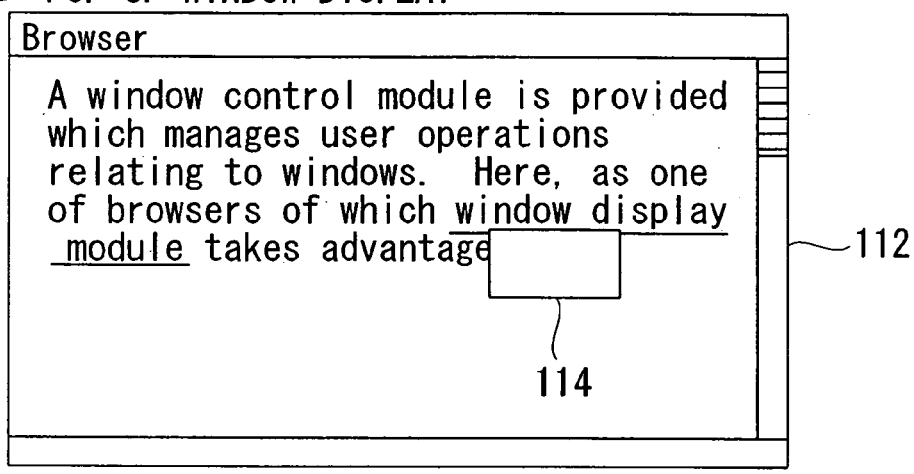
FIG. 1C  PRESENTATION OF LINKED CONTENTS
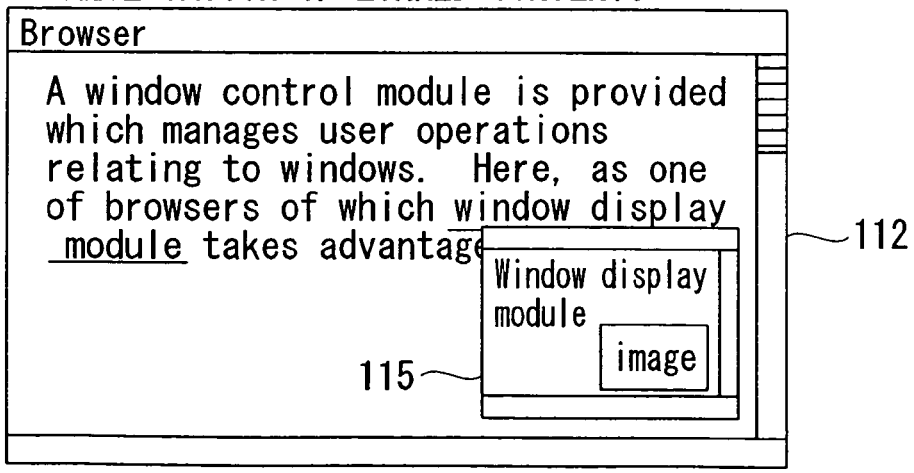

FIG. 2A SCREEN PRESENTED TO USER
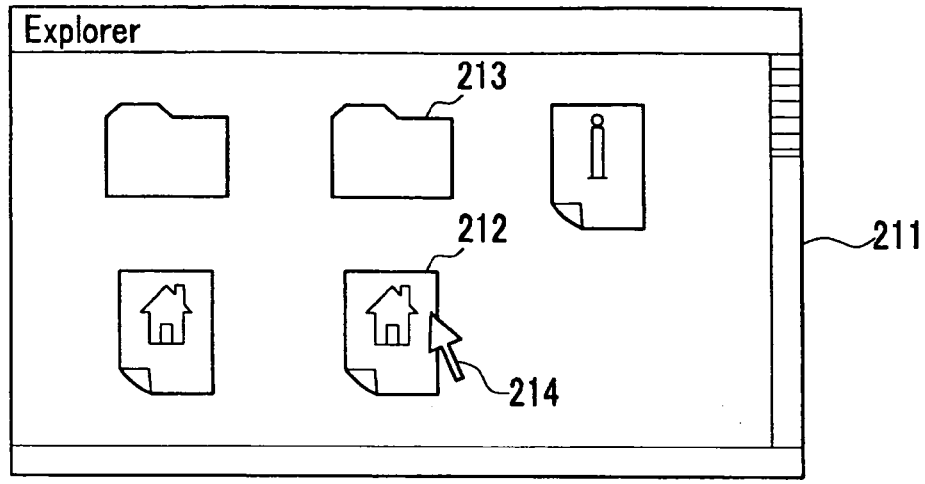
FIG. 2B BROWSING CONTENTS OF FILE
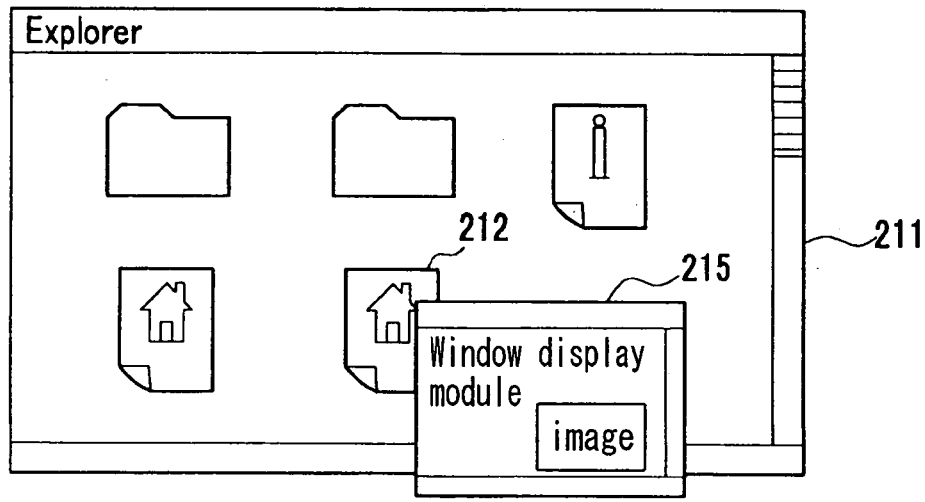
FIG. 2C BROWSING CONTENTS OF FOLDER
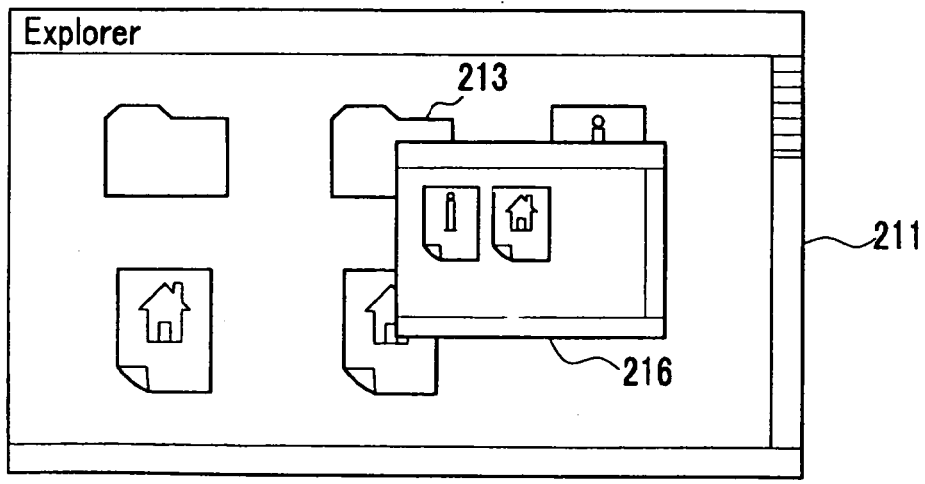

FIG. 14A SCREEN PRESENTED TO USER
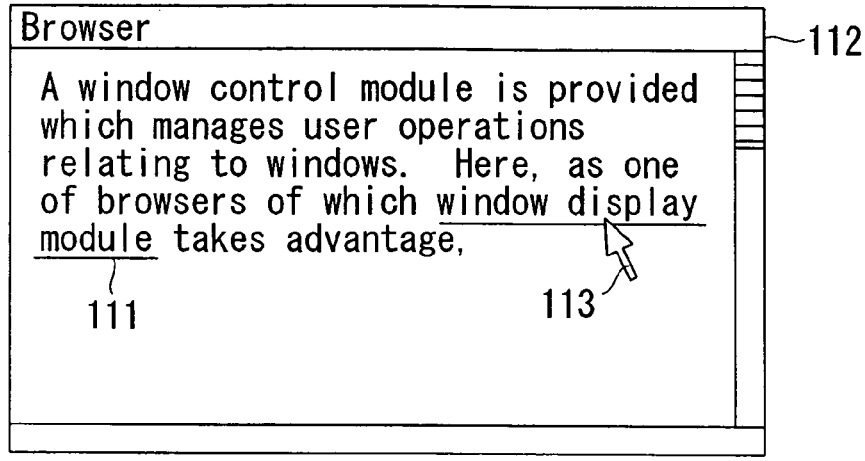
FIG. 14B PRESENTATION OF LINKED CONTENTS
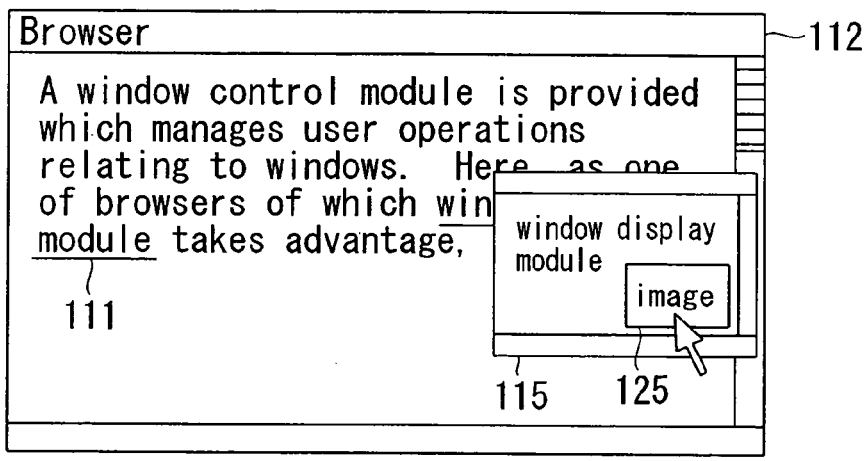
FIG. 14C PRESENTATION OF MULTIPLE LINKED CONTENTS
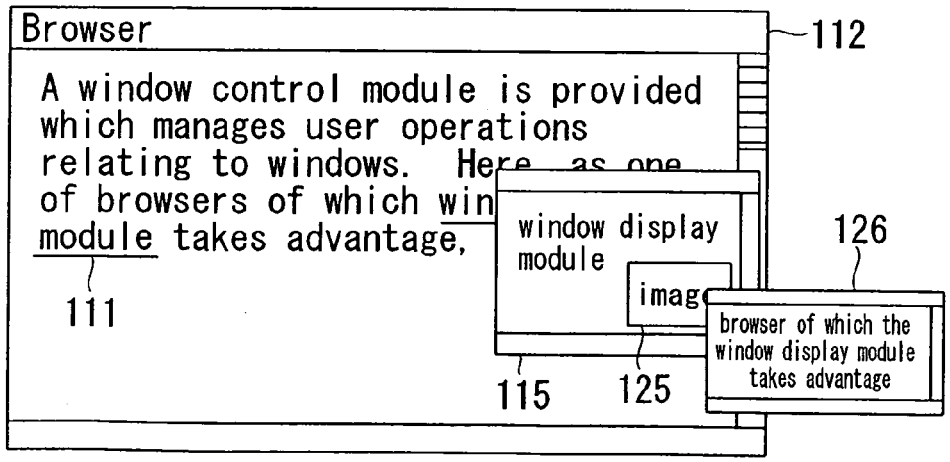

FIG. 15A SCREEN PRESENTED TO USER
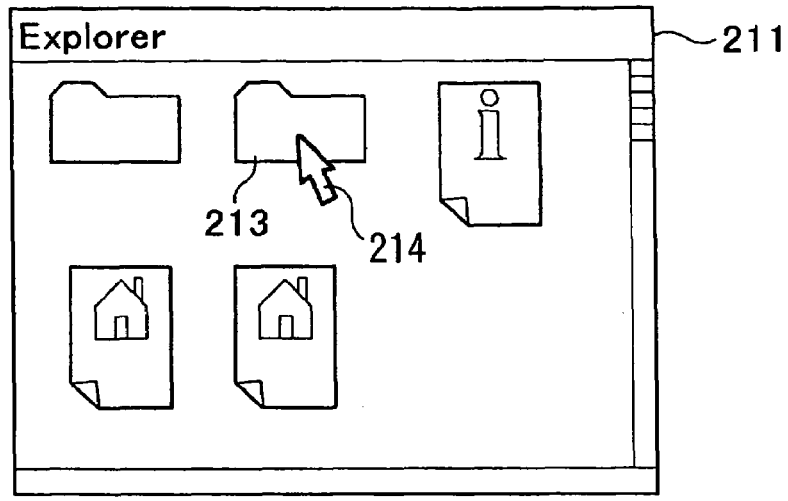
FIG. 15B BROWSING CONTENTS OF FOLDER
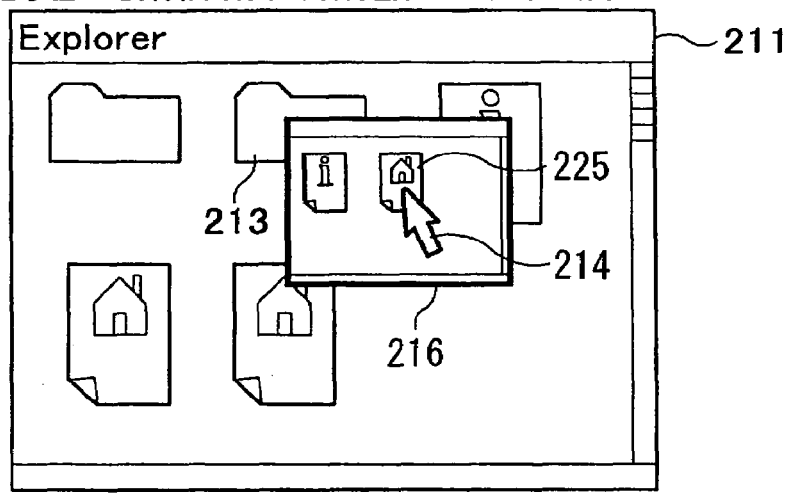
FIG. 15C BROWSING FILE
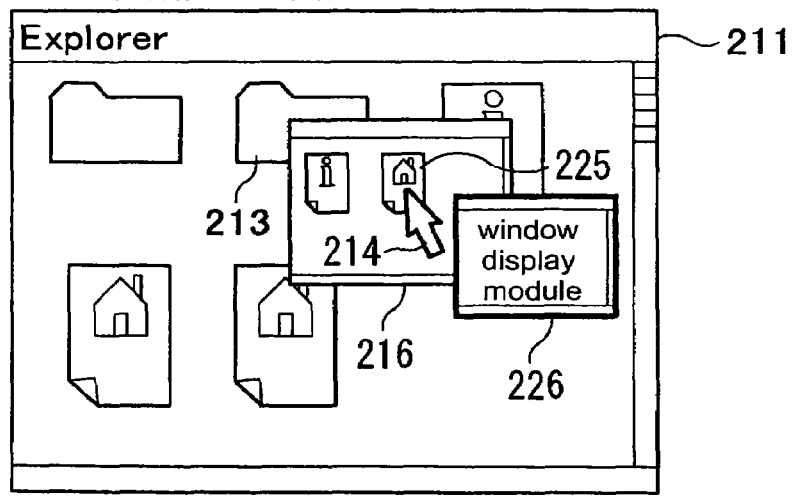

| WINDOW | DISPLAY POSITION | SIZE | ANCHOR POSITION | DISPLAY DIRECTION |
|---|---|---|---|---|
| 1 | 100,100 | 600*400 | 200,100 | 315 |
| 2 | 310,210 | 420*280 | 200,200 | 315 |
| 3 | 520,410 | 378*252 | | 340 |
| | | | | |

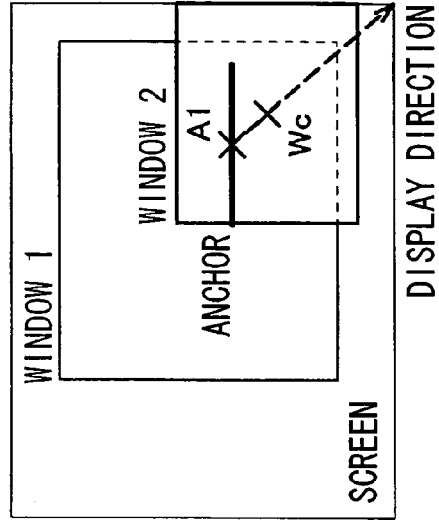
FIG. 20B FIND DISPLAY POSITION
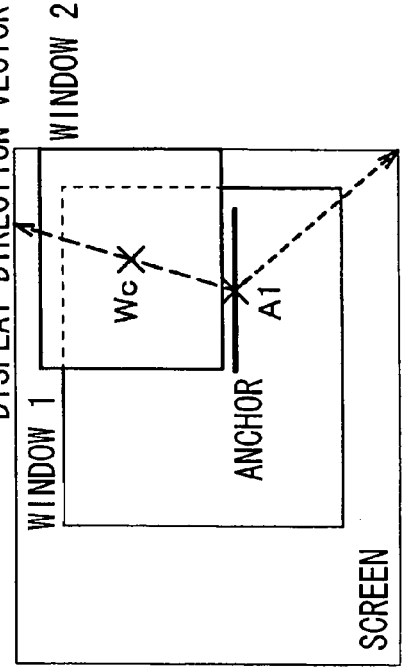
FIG. 20D DETERMINE DISPLAY POSITION DISPLAY DIRECTION VECTOR
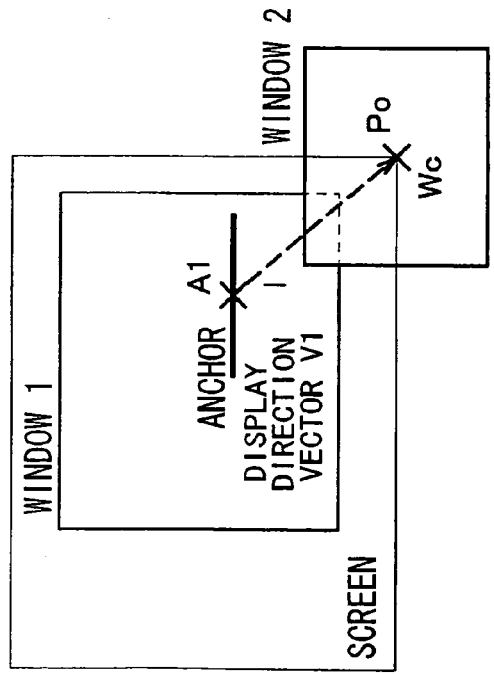
FIG. 20A INITIAL STATE
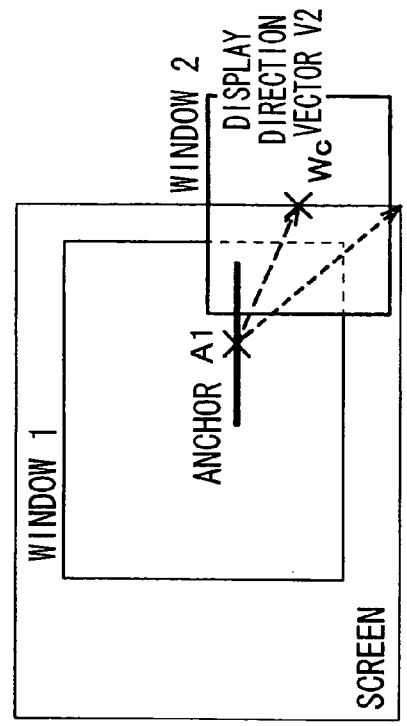
FIG. 20C CHANGE DISPLAY DIRECTION

LINKED CONTENTS BROWSING SUPPORT DEVICE, LINKED CONTENTS CONTINUOUS BROWSING SUPPORT DEVICE, AND METHOD AND PROGRAM THEREFOR, AND RECORDING MEDIUM THEREWITH

BACKGROUND OF THE INVENTION

1. Field of the Invention

The present invention relates to a linked contents browsing support device, relates to a linked contents browsing support method, relates to a program which executes the method to enable a user to quickly and efficiently browse contents (linked contents) connected with an anchor (a hyperlink), an icon, or the like which has a linked destination, and also to enable the user to quickly return to the state before browsing the linked contents, and relates to a recording medium storing the program. Furthermore, the present invention relates to a linked contents continuous browsing support device, relates to a linked contents continuous browsing support method, relates to a program which executes the method to enable a user to continuously browse linked contents, and relates to a recording medium storing the program.

Priority is claimed on Japanese Patent Application No. 2002-347196 filed Nov. 29, 2002, and Japanese Patent Application No. 2003-271599 filed Jul. 7, 2003, the contents of which are incorporated herein by reference.

2. Description of the Related Art

With a browser for the WWW (World Wide Web) or a file management application (Explorer or the like) in a GUI (Graphical User Interface) environment, the user selects an anchor or an icon or the like with a mouse cursor, and, by clicking it, browses the contents (hereinafter termed the linked contents) which have been connected to each anchor or icon.

As such an anchor, there may be a segment of text or a graphical item in an HTML (Hyper Text Markup Language) document or the like which fulfills the function of establishing a link between some contents and some other contents, and this is termed "marking" or "linking".

When the user wishes to know of what information the linked contents consists, he clicks upon the anchor (the link) in a browser or the like to access the linked contents, and browses the linked contents.

Here, if the linked contents do not consist of the information which the user desires and he accordingly wishes to return to the contents previously browsed (which includes the anchor previously clicked), then it becomes necessary for him to perform clicking operation in order to close the linked contents and to return to these contents previously browsed. With browsing action for linked contents, generally, the user must repeatedly perform such movement between contents as above described until he reaches the desired linked contents. Furthermore, since a large number of anchors or icons or the like may be present, in order to view the desired linked contents from among them, it is necessary repeatedly to perform the above operations for each one of these anchors or icons, the burden imposed upon the user by such operations may thereby become very great.

Furthermore, for a browser to present linked contents, methods may be employed for presenting the linked contents by substituting them for the contents which were previously being displayed in the browser, or for presenting them in a new browser. However, since, with such methods for presentation of linked contents by such clicking operation or presentation of linked contents in a browser, the system does not continue to present the contents which the user has been browsing up until that moment along with the new contents, there is a problem in that the flow of thought of the user is interrupted, so that the efficiency of browsing of the contents deteriorates. In particular, when the user is following up linked contents in order, so that he is continuously browsing some contents, this method is inefficient, and the procedure is very inconvenient for the user.

In this connection, in order to solve this problem, various techniques have been proposed as methods for supporting simple and efficient browsing of linked contents.

For example, there is a technique which has been implemented in Windows (registered trademark) Explorer, in which, when the mouse cursor is put on an anchor or an icon (before it is clicked), its summary or a preview image is displayed in a pop-up window; and, when the mouse cursor is moved from the anchor or the icon, this pop-up window is closed.

Moreover, there is also a technique for writing a tag for pop-up display with Java (registered trademark) Script or with DHTML (Dynamic HTML) in an anchor in advance, and for pop-up displaying the linked contents which this anchor indicates when the mouse cursor is put upon the anchor. Such techniques are described, for example: in paragraphs [0004] through [0008] and paragraphs [0011] through [0045] of Japanese Unexamined Patent Application, First Publication No. Hei 11-003201 (hereinafter termed "Patent Reference 1"); in paragraphs [0021] through [0043] of Japanese Unexamined Patent Application, First Publication No. 2000-276471 (hereinafter termed "Patent Reference 2"); in the publication "inlineLink: Inline Expansion Link Methods in Hypertext Browsing", by Motoki Miura, Buntarou Shizuki and Jiro Tanaka, Proceedings of International Conference on Internet Computing (IC2001), June 2001, Vol. II, pp. 653-659; and in the publication "Zero-Click: a system to support Web-browsing", by Tomoyuki Nanno, Suguru Saito, and Manabu Okumura, 63rd Information Processing Society of Japan, Proceedings of the 60th National Convention, 2J-06, 2001.

However, with conventional pop-up display methods, it is necessary to set in advance, for each anchor or icon or the like, information related to the linked contents (attribute information, text information, a thumbnail image or the like), or Java (registered trademark) Script for performing the pop-up display, in addition to the linked contents. Furthermore, it is necessary to create in advance the information related to the linked contents which is to be displayed in the pop-up window, separately from the linked contents themselves. Due to this, with conventional methods, it is necessary to determine, at the time of setting an anchor or an icon, in other words, at the time of creating HTML documents or the contents which are indicated by an icon, whether or not the pop-up display function will be utilized and the contents to be pop-up displayed, and this is undesirable; moreover, it is not possible to add a pop-up display function dynamically at the time of browsing operation by the user, or to create and edit its displayed contents.

Furthermore, with conventional techniques, the focus has been upon operational methods for performing browsing action of linked contents in a simple manner, and there has been no real consideration of what type of information it might be best to present as the information which is displayed in a pop-up window in relation to the linked contents, or as to the best type of format in which it should be presented; in other words, there has been no emphasis put upon proper editing and display methods for the information. However, if the display region for the information is small, such as a pop-up display window, then study of editing and display methods for the information which is to be presented in this manner are considered to be particularly important.

Furthermore, with conventional techniques, only a linked content indicated by an anchor or an icon in a browser or in an application is pop-up displayed.

In other words, browsing over multiple linked contents continuously, for example, display of the second linked contents (a grandchild window) which are indicated by an anchor or an icon in the first linked contents (a child window) which have been pop-up displayed from an anchor or an icon in a browser window or the like (a parent window) has not been contemplated.

To put it in another way, no control method for pop-up windows has yet been contemplated, with which it is possible to perform continuous browsing of multiple linked contents efficiently (refer to Patent Reference 2).

Furthermore, as has been described above, in none of the conventional techniques has the focus been addressed to an operation method for making it easy to perform operation for browsing linked contents, and no consideration has been given with regard to the position and to the display size of the pop-up window in which the linked contents are to be displayed.

However it is believed that, if multiple linked contents are to be pop-up displayed continuously within a region of a desktop screen which is relatively limited, investigation related to the position and to the display size of each window (pop-up window) within which pop-up display is to be performed is of particularly great importance.

SUMMARY OF THE INVENTION

The present invention has been conceived in the light of these problems, and an object of the present invention is to provide a linked contents browsing support device, a method and a program therefor, and a recording medium therewith which make it possible to pop-up display information related to linked contents which are indicated by any type of anchor or icon or the like, even without setting related to pop-up display for each anchor or icon or the like in advance; and moreover which implement simple and efficient browsing of linked contents by the user, by dynamically creating information which is to be presented by summarizing or editing the linked contents, and by also changing the font size of text or the size of images according to the display region.

Furthermore, an object of the present invention is to provide a linked contents continuous browsing support device, a method, and a program and recording medium therewith, which can perform pop-up display of linked contents which are indicated by an anchor or icon continuously, and which, when displaying such linked contents continuously, controls the display position and the display size of the pop-up window according to the position of the anchor or the icon upon the desktop screen, thus enabling the user continuously to browse linked contents in an easy manner.

The linked contents browsing support device according to the present invention is one which supports, via an object which has a linked destination, browsing of linked contents which are contents connected to the object, comprising: a mouse event observation section which observes a mouse event of a mouse cursor upon a screen of an information device by a user, and detects from the mouse event that the mouse cursor has entered into a region of the object which has the linked destination; a window display section which responds to the fact that the mouse event observation section has detected that the mouse cursor has entered into the region of the object which has the linked destination, and displays a new window upon the screen; a linked contents acquisition section which acquires linked contents which are connected to the object for which it has been detected by the mouse event observation section that the region has been entered into; and a linked contents presentation section which creates contents for presentation based upon the linked contents which have been acquired, and displays the created contents for presentation within the new window which has been displayed upon the screen.

Furthermore, the linked contents browsing support method according to the present invention is one which supports, via an object which has a linked destination, browsing of linked contents which are contents connected to the object, comprising: a step in which a mouse event observation section observes a mouse event of a mouse cursor upon a screen of an information device by a user, and detects from the mouse event that the mouse cursor has entered into a region of the object which has the linked destination; a step in which, in response to the fact that the mouse event observation section has detected that the mouse cursor has entered into the region of the object which has the linked destination, a window display section displays a new window upon the screen; a step in which a linked contents acquisition section acquires linked contents which are connected to the object for which it has been detected by the mouse event observation section that the region has been entered into; and a step in which a linked contents presentation section creates contents for presentation based upon the linked contents which have been acquired, and displays the created contents for presentation within the new window which has been displayed upon the screen.

Furthermore, the linked contents browsing support program according to the present invention is one which supports, via an object which has a linked destination, browsing of linked contents which are contents connected to the object, comprising: a step of making a mouse event observation section observe a mouse event of a mouse cursor upon a screen of an information device by a user, and of making the mouse event observation section detect the fact that the mouse cursor has entered into a region of the object which has the linked destination, based on the mouse event; a step of, in response to the fact that the mouse event observation section has detected that the mouse cursor has entered into the region of the object which has the linked destination, making a window display section display a new window upon the screen; a step of making a linked contents acquisition section acquire linked contents which are connected to the object for which it has been detected by the mouse event observation section that the region has been entered into; and a step of making a linked contents presentation section create contents for presentation based upon the linked contents which have been acquired, and of making the linked contents presentation section display the created contents for presentation within the new window which has been displayed upon the screen.

It should be understood that "mouse event" relates to positional information of the mouse cursor within the browser or a window.

According to these aspects, mouse operation by the user is always observed, and, if the mouse cursor enters into a region of an object which has a linked destination, first a new window is displayed, and thereafter the linked contents which are designated by the object which has a linked destination are acquired, and are displayed within the new window as contents for presentation. Accordingly, it is possible to display the information of the linked contents within the pop-up window, even without settings for pop-up display or the like of the linked contents having been performed in advance for the object (an anchor or an icon or the like) which has a linked destination. Therefore, along with the burden which is imposed upon the user by pop-up display or the like being alleviated, it is also possible to perform pop-up display even for already existing contents for which no settings relating to pop-up display or the like has been established.

Furthermore, if the contents for presentation are created so as to include link information of linked contents, it becomes possible for the user to perform continuous browsing of the linked contents. Furthermore, it is possible for him efficiently to browse multiple linked contents in a continuous manner.

With the above linked contents browsing support device, there may be further comprised a contents processing section which performs an summarizing or editing procedure of the linked contents which have been acquired, based upon a contents conversion rule for summarizing or editing contents in a display format or style, and wherein the linked contents presentation section displays the contents upon which the summarizing or editing procedure has been performed by the contents processing section within the new window as the contents for presentation.

In the same manner, with the above linked contents browsing support method, there may be further comprised a step in which a contents processing section performs a summarizing or editing procedure of the linked contents which have been acquired by the linked contents acquisition section, based upon a contents conversion rule for summarizing or editing contents in a display format or style, and wherein the linked contents presentation section displays the contents upon which the summarizing or editing procedure has been performed by the contents processing section within the new window as the contents for presentation.

In the same manner, with the above linked contents browsing support program, there may be further comprised a step of making a contents processing section perform a summarizing or editing procedure of the linked contents which have been acquired by the linked contents acquisition section, based upon a contents conversion rule for summarizing or editing contents in a display format or style, and wherein the linked contents presentation section is made to display the contents upon which the summarizing or editing procedure has been performed by the contents processing section within the new window as the contents for presentation.

In this manner, the contents for presentation which are to be displayed within the new window is summarized or edited information which has been dynamically created by summarizing or editing the linked contents, thus it is possible for the user to simply, quickly, and efficiently browse and understand the linked contents. Furthermore, it is possible to display various versions of the contents for presentation according to the number of windows or according to the details of the contents by preparing various contents conversion rules for converting the contents for presentation. Accordingly, even if multiple windows (contents for presentation) are being pop-up displayed by, for example, performing continuous browsing of the linked contents, it is possible for the user to perform browsing efficiently, and it becomes easy for him to comprehend the contents.

By creating the contents for presentation by editing a copy of the linked contents, and by storing them separately from the linked contents, it becomes possible to present the information relating to the linked contents in various ways. Various different possibilities may be considered for contents conversion rules, for example, copying the linked contents just as they are without alteration as the contents for presentation, and ones which take advantage of various media conversion rules which have already been proposed.

With the above linked contents browsing support device, the linked contents presentation section may comprise a window control section which responds to an action by the user with respect to the new window, and performs window control corresponding to the action.

In the same manner, with the above linked contents browsing support method, there may be further comprised a step of the linked contents presentation section, in response to an action by the user with respect to the new window, utilizing a window control section to perform window control corresponding to the action.

In the same manner, with the above linked contents browsing support program, there may be further comprised a step of, in response to an action by the user with respect to the new window, making the linked contents presentation section perform window control corresponding to the action, by utilizing a window control section.

With the above linked contents browsing support method, there may be further comprised a step of, after the contents for presentation have been displayed within the new window, the window control section, in response to a window closing request from the user, closing the new window when the mouse cursor has come to be no longer put upon the new window.

According to this aspect, it is possible to quickly return to the state before browsing by closing the window in response to the window closing request from the user.

It should be understood that there may be various types of input operation to the computer for an information display request from the user with respect to an object which has a linked destination, and for a window closing request from the user for a window in which the information of the linked contents has been displayed. For example, the mouse cursor may be put on the object, the mouse cursor may be moved to outside the window, or a command may be input from the keyboard, or the like. In the following, the explanation will presume the case of an operation by the mouse cursor.

With the above linked contents browsing support method, there may be further comprised a step of the window control section, after the contents for presentation have been displayed within the new window, responding to operation of a mouse wheel by the user, and scrolling the contents for presentation which are being displayed within the new window in accordance with rotation of the wheel.

According to this aspect, after the contents for presentation have been displayed within the new window, the user is able to scroll the contents for presentation simply by operating the wheel of the mouse, without performing any special action for selecting the new window.

With the above linked contents browsing support method, there may be further comprised a step of the window control section, after the contents for presentation have been displayed within the new window, responding to mouse movement operation to within the new window by the user, and establishing a state in which an object which has a linked destination within the new window can be selected.

According to this aspect, if the mouse cursor has been moved to within the new window, this is interpreted as an action with respect to the contents for presentation which are being displayed within the new window, and, if the user puts the mouse cursor upon an object within the contents for presentation, another new window is displayed over the window in which the contents for presentation are being displayed, and the contents for presentation which are indicated by the above accessed object are displayed within the new window.

With the above linked contents browsing support method, there may be further comprised a step of the window control section, after the contents for presentation have been displayed within the new window, responding to an action by the user which has been determined upon in advance, and, along with closing all the windows in which the contents for presentation are being displayed, displays, using an application which corresponds to a data format of contents to be displayed, the contents for presentation which have been displayed within the window which the action by the user, which has been determined upon in advance, has generated or the linked contents which are the source for the contents for presentation, within a window which is newly opened upon the screen by the application.

According to this aspect, the user is able to display the contents for presentation which are being displayed within any window, or the linked contents which are the source for the contents for presentation, within a window of a normal size which the application opens, at any timing he desires. Furthermore, since it is arranged to close all of the windows in which the contents for presentation were being displayed at the time that the predetermined action is performed, it is possible to eliminate the trouble which otherwise would be imposed upon the user for closing these windows.

With the above linked contents browsing support device, the mouse event observation section may detect the fact that the mouse cursor has been put on an object which has the linked destination, and may decide that the mouse cursor has entered into a region of an object which has the linked destination.

In the same manner, with the above linked contents browsing support method, there may be further comprised a step of the mouse event observation section detecting the fact that the mouse cursor has been put on an object which has the linked destination, and deciding that the mouse cursor has entered into a region of an object which has the linked destination.

In the same manner, with the above linked contents browsing support program, there may be further comprised a step of making the mouse event observation section detect the fact that the mouse cursor has been put on an object which has the linked destination, and making the mouse event observation section decide that the mouse cursor has entered into a region of an object which has the linked destination.

According to these aspects, it becomes possible to display the contents for presentation which correspond to the linked contents for which a link has been established with the object, only by the user putting the mouse cursor on the object, and even though the user does not perform an action such as clicking with the mouse or the like upon the object which has a linked destination.

With the above linked contents browsing support method, there may be further comprised a step of the linked contents presentation section, when displaying the contents for presentation within the new window, increasing or decreasing the display magnification ratio in accordance with the size of the new window.

In this manner, by automatically increasing or decreasing the display magnification ratio (for example, of the font size of text or of the size of an image) in accordance with the display region of the new window, it becomes possible for the user to browse and understand the information relating to the linked contents simply, quickly and with high efficiency, even though the screen is small.

With the above linked contents browsing support device, the window display section may comprise: an anchor position acquisition section which, when the mouse event occurs, acquires the position upon the screen of the object into the region of which the mouse cursor has entered; a display size calculation section which acquires the display size for the window in which the object is displayed, and calculates a display size for the new window which displays the contents for presentation which correspond to the object, based upon the display size which has been acquired; and a display position derivation section which derives a display position upon the screen of the new window, based upon the position upon the screen of the object which has been acquired by the anchor position acquisition section, upon the display size of the new window which has been calculated by the display size calculation section, upon the display position upon the screen of the window in which the object is displayed, and upon the display direction of the new window, and wherein the new window is displayed in the display position which has been derived by the display position derivation section.

In the same manner, with the above linked contents browsing support method, there may be further comprised: a step of the window display section, when the mouse event occurs, utilizing an anchor position acquisition section to acquire the position upon the screen of the object into the region of which the mouse cursor has entered; a step of the window display section utilizing a display size calculation section to acquire the display size for the window in which the object is displayed, and to calculate a display size for the new window which displays the contents for presentation which correspond to the object, based upon the display size which has been acquired; and a step of the window display section utilizing a display position derivation section to derive a display position upon the screen of the new window, based upon the position upon the screen of the object which has been acquired by the anchor position acquisition section, upon the display size of the new window which has been calculated by the display size calculation section, upon the display position upon the screen of the window in which the object is displayed, and upon the display direction of the new window, and wherein the window display section displays the new window in the display position which has been derived by the display position derivation section.

In the same manner, with the above linked contents browsing support program, there may be further comprised: a step of, when the mouse event occurs, making the window display section acquire the position upon the screen of the object into the region of which the mouse cursor has entered, by utilizing an anchor position acquisition section; a step of making the window display section acquire the display size for the window in which the object is displayed by utilizing a display size calculation section, and making the window display section calculate a display size for the new window which displays the contents for presentation which correspond to the object by using the display size calculation section, based upon the display size which has been acquired; and a step of making the window display section derive a display position upon the screen of the new window by utilizing a display position derivation section, based upon the position upon the screen of the object which has been acquired by the anchor position acquisition section, upon the display size of the new window which has been calculated by the display size calculation section, upon the display position upon the screen of the window in which the object is displayed, and upon the display direction of the new window; and making the window display section display the new window in the display position which has been derived by the display position derivation section.

According to these aspects, since the display position of the pop-up window and the like is controlled based upon the position of the object upon the screen, the display size of the new window, the display position upon the screen for the window in which the object is displayed, and the display direction of the new window, it becomes easy for the user to browse each window (each content for presentation), even when windows are being continuously displayed upon the screen of the information device.

With the above linked contents browsing support method, there may be further comprised: a step of the window display section, when displaying the new window in the display position which has been derived by the display position derivation section, recording a window number which indicates the display order of the windows which are being displayed upon the screen in a window management table in the order of window display; and a step of the linked contents presentation section utilizing a window control section to detect that the mouse cursor has moved from the new window which has been popped up last to within any one of the windows which are recorded in the window management table, and, based upon the window numbers which are stored in the window management table, closing the other windows, other than the window after movement, among the windows which have been displayed in order from the window after movement to the new window which has been displayed last.

According to this aspect, it is possible to control the display positions and the display sizes of the pop-up windows based upon the display order of the pop-up windows, since the windows which are popped up upon the screen are stored (recorded) in the window management table in display order. By performing display control of the pop-up windows and the like in this manner, it becomes possible for the user easily to browse each window (each content for presentation), even when windows are being displayed in a continuous manner upon the screen.

Furthermore, since when the mouse cursor has been moved from the window which has been popped up last to any one of the windows which are displayed, the pop-up windows which have been popped-up posterior to the window after movement are closed, and thereby, when the user returns to a window to browse the contents in the window after movement, the system is returned to the same state as when he previously browsed these contents. In other words, when, after the user has continuously browsed the linked contents, he can easily retrace his steps and again browse the previously browsed contents, and it is possible to alleviate the load upon the user which is required for operation to arrive at the linked contents which he desires.

It should be understood that, "the window which has been popped up last" means the pop-up window (PreWin) in which the mouse cursor was located until just before the movement, as will be described hereinafter in the description of the preferred embodiments of the present invention, while "the window after movement" means the window (NowWin) in which the mouse cursor is at the present time, as will also be described hereinafter in the description of the preferred embodiments. Furthermore, "the window number" means the "window number" which will be described hereinafter in the description of the preferred embodiments.

With the above linked contents browsing support method, the window control section may not perform the window closing when the mouse cursor has returned to the window which has been popped up last, until a predetermined time period has elapsed from detecting that the mouse cursor has moved to the window after movement.

According to this aspect, even if the user mistakenly moves the mouse cursor from the window which has been popped up last to some window which is displayed, he is able to prevent the closing of the windows which he actually wants to remain open, by returning the mouse cursor to the window which has been popped up last, within the predetermined time period.

With the above linked contents browsing support method, there may be further comprised: a step of the display position derivation section taking the display position upon the screen of the object as an origin, and detecting a point upon a predetermined direction line for which, if the point upon the direction line is taken as the central position of the new window, the entire region of the new window is displayed upon the screen; a step of the display position derivation section detecting, from among the points which have been detected, a point for which a window for which this point has been taken as the central position is not put upon the object; and a step of the display position derivation section determining a display position upon the screen of the new window, based upon the point for which the window is not put upon the object.

According to this aspect, since the pop-up windows or the like are continuously pop-up displayed upon the predetermined direction line (whose direction has been determined in advance) which takes the object which is the source of the link as origin, accordingly, if the user is continuously browsing multiple pop-up windows, it becomes possible for him easily to anticipate the position of the next pop-up window to be displayed. Furthermore since, for the window which is pop-up displayed, the entire region of the window is displayed, and moreover it is displayed in a position which is not overlapped with the object which is the source of the link (so that it does not hide that object), accordingly it becomes possible for the user easily to perform continuous browsing of the linked contents, and it is possible for the user to browse the linked contents at high efficiency without interrupting the flow of his thoughts.

With the above linked contents browsing support method, there may be further comprised a step of the display position derivation section, if it has not been possible to detect a point for which the window is not put upon the object, shifting the predetermined direction line by a predetermined angle each time, and detecting a point upon the direction line for which the entire region of the new window is displayed upon the screen.

According to this aspect, since, even if it is not possible to pop-up display the pop-up windows or the like continuously upon the predetermined direction line, a display position is detected which is positioned near the predetermined direction line by repeatedly shifting the direction line by a predetermined angle, and thereby the pop-up windows are displayed continuously in a direction (in positions) which is close to the predetermined direction (the display direction which has been determined in advance), taking the position of the object which is the source of the link as origin. Accordingly, if the user is performing continuous browsing of multiple windows, it becomes possible for him easily to anticipate the position of the next window which will be pop-up displayed. Furthermore since, for the window which is being pop-up displayed, the entire region of the window is displayed, and moreover it is displayed in a position which does not hide the object, accordingly it becomes possible for the user easily to perform continuous browsing of the linked contents, and it is possible for the user to browse the linked contents at high efficiency without interrupting the flow of his thoughts.

With the above linked contents browsing support method, there may be further comprised a step of the display position derivation section, if it is not possible to derive a display position in which the entire region of the new window is displayed upon the screen and the new window is not put on the object, changing the display direction of the new window, deriving a display position in which the entire region of the new window is displayed upon the screen, and determining a display position for which the size of the region of the object which is hidden by the new window when the new window has been displayed in each of the display positions is the minimum, as the display position for the new window.

According to this aspect, it still becomes possible to display the contents for presentation within the new window while minimizing the region of the object which is hidden by the new window, even if it is not possible to derive a display position in which the entire region of the new window is displayed upon the screen and moreover the new window does not hide the object.

With the above linked contents browsing support method, there may be further comprised a step of the display position derivation section, if it is not possible to derive a display position in which the new window does not hide the entire region of the object, demagnifying the size of the new window in a stepwise manner, and deriving a display position in which the entire region of the new window is displayed upon the screen and the new window does not hide the object.

According to this aspect, even if the entire region of the object is hidden no matter where the new window is displayed, still, by reducing the size of the new window in a stepwise manner, it becomes possible to derive a display position in which the entire region of the new window is displayed upon the screen and moreover the new window does not hide the object.

A recording medium according to the present invention is a computer readable recording medium upon which is recorded a linked contents browsing support program of any of the types described above.

BRIEF DESCRIPTION OF THE DRAWINGS

FIGS. 1A through 1C are figures showing examples of displays which relate to anchors, in the first preferred embodiment of the present invention.

FIGS. 2A through 2C are figures showing examples of displays which relate to icons, in the first preferred embodiment of the present invention.

FIGS. 14A through 14C are figures showing examples of presentation (display) screens for the user, provided by this continuous browsing support device for linked contents according to the second preferred embodiment of the present invention.

FIGS. 15A through 15C are figures showing examples of presentation (display) screens for the user, when this continuous browsing support device for linked contents according to the second preferred embodiment of the present invention has been applied to software which manages files.

FIGS. 20A through 20D are figures for explanation of a procedural flow performed by a display position derivation section of FIG. 17 for derivation of the display position of a pop-up window.

DETAILED DESCRIPTION OF THE INVENTION

Figure 3:
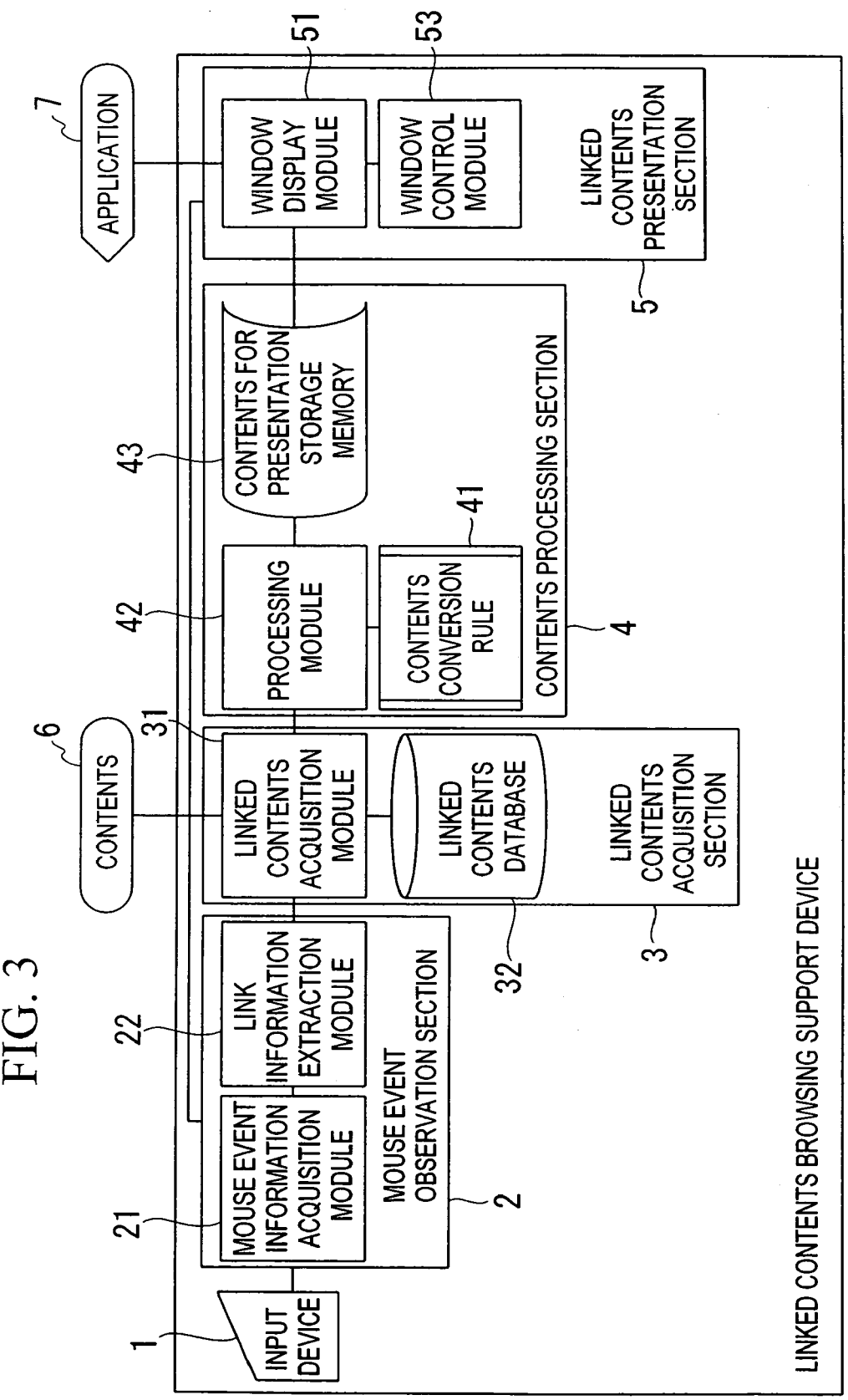
FIG. 3 is a block diagram showing the structure of a linked contents browsing support device according to the first preferred embodiment of the present invention.

In the following, preferred embodiments of the present invention will be described in detail with reference to the figures.

First Preferred Embodiment

FIGS. 1A through 1C are figures showing examples of presentation (display) screens which are provided to the user by the linked contents browsing support device according to this first preferred embodiment of the present invention.

First, an outline of the operation of this linked contents browsing support device will be explained using the sample screens shown in FIGS. 1A through 1C.

With the linked contents browsing support device according to the first preferred embodiment of the present invention, as shown in FIGS. 1A through 1C, when, for example, a text (an HTML document) which includes an anchor (a hyperlink) 111 (underlined text) is displayed in a browser 112, by putting a mouse cursor 113 on this anchor 111 (refer to FIG. 1A), the mouse cursor 113 changes to a pop-up window 114 (refer to FIG. 1B), and information related to the linked contents which are indicated by this anchor 111 is demagnified and is displayed within the pop-up window 115 as contents for presentation (refer to FIG. 1C).

The font size of text and the image sizes of the contents for presentation which are displayed in the pop-up window 115 vary according to the display region (the image size) of the pop-up window 115. By doing this, even if the display region of the pop-up window is small, it becomes easy for the user to browse the contents for presentation corresponding to the linked contents, so that it is possible to enhance the efficiency of browsing the contents.

Furthermore, with this first preferred embodiment of the present invention, not only can it be utilized for the operation of browsing the linked contents indicated by an anchor, but it can also be utilized for the operation of browsing the contents indicated by an icon (the linked contents).

FIGS. 2A through 2C are figures showing examples of presentation (display) screens which are provided to the user, when the linked contents browsing support device according to this first preferred embodiment of the present invention is being utilized as software for file management. The operation of the linked contents browsing support device in this case will now be explained using the sample screens shown in FIGS. 2A through 2C.

As shown in FIGS. 2A through 2C, when, for example, a file icon 212 or a folder icon 213 is being displayed in a window 211 of a software program (such as Explorer or the like) for managing a large number of files (refer to FIG. 2A), then, by putting a mouse cursor 214 upon this file icon 212, a new pop-up window 215 is displayed, and contents for presentation which give the contents of this file icon 212 are demagnified and are displayed within this pop-up window 215 (refer to FIG. 2B); while, by putting the mouse cursor 214 upon the folder icon 213, a new pop-up window 216 is displayed, and a list of the files which are present within this folder icon 213 is demagnified and is displayed within this pop-up window 216 (refer to FIG. 2C).

In the above, an outline of the operation of the linked contents browsing support device according to this first preferred embodiment of the present invention has been explained.

Although, in the explanation detailed hereinafter, the discussion will focus upon the case of the object having a linked destination being the anchor, and HTML document being the linked contents, nevertheless it would also be possible, if the object having a linked destination were to be an icon, to implement browsing of the linked contents with an equivalent procedure.

FIG. 3 is a block diagram showing the structure of the linked contents browsing support device according to the first preferred embodiment of the present invention, which comprises an input device 1, a mouse event observation section 2, a linked contents acquisition section 3, a contents processing section 4, and a linked contents presentation section 5; and contents 6 (for example, multimedia contents) are set as linked contents, with an application (a software program) 7 existing separately and being utilized for the display of the linked contents.

The input device 1 is one for operating a mouse cursor in a GUI environment, and, in addition to a mouse, it may utilize a keyboard (the cursor keys), a touch panel display, a pen tablet, a trackball, an eye-gaze input device, a digitizer or the like, any of which can be utilized together with a mouse. Furthermore, operation of the linked contents browsing support device for inputting a request from the user for the display of linked information for an object, or a request for closing a pop-up window in which information of linked contents has been displayed, is mouse click operation, mouse movement operation, operation via a keyboard, or the like. In the following, it will be assumed that a mouse is utilized as the input device 1, and the explanation will presume that input operation for requesting display of linked information and for requesting closing of windows is performed by movement operation and/or click operation of this mouse.

The mouse event observation section 2 always observes mouse events upon the screen, and acquires information related to an anchor or an icon or the like which is underneath the mouse cursor from event information which is generated when the mouse cursor has been put upon this anchor or icon or the like. Furthermore, the mouse event observation section 2 comprises a mouse event information acquisition module 21 which observes mouse events in the window or the browser, and, when the mouse cursor has been put upon an anchor or an icon or the like, acquires the mouse event which is sent to the window or the browser via this mouse event information acquisition module 21. A link information extraction module 22 extracts link information related to the anchor or the icon or the like which is underneath the mouse cursor from the mouse event which has been acquired. Here, the link information which is extracted is the URL (Uniform Resource Locator) address which has been designated by the anchor, the file name of the file which the icon represents, or the like. It should be understood that the mouse event acquisition module 21 consists of, for example, a mouse hook DLL (Dynamic Link Library).

Using a linked contents acquisition module 31, the linked contents acquisition section 3 acquires the contents which are designated by the link information which has been acquired by the mouse event observation section 2, and stores them in a linked contents database 32 in the user's computer. At this time, if the linked contents are online contents, it downloads these contents and stores them, while, if they are contents which exist in the user's computer, it acquires a copy of these contents and stores that copy.

The contents processing section 4 performs conversion processing such as summarization or editing and the like upon the information of the linked contents which has thus been acquired, based upon one or more contents conversion rules 41. The contents processing section 4 comprises contents conversion rules 41 for summarizing or editing contents into various display formats and styles, a processing module 42 which reads these contents conversion rules 41 and performs summarization or editing processing of the linked contents which have been acquired, and a contents for presentation storage memory 43 which stores the contents after summarization or editing. Here, the contents for presentation are created by editing the copy of the linked contents, and then it is stored separately from the linked contents. As a result, presentation of the information in the linked contents can be implemented in various styles when it is pop-up displayed. Various possibilities may be conceived of as contents conversion rules. For example, the linked contents are copied just as they are without alteration as the contents for presentation. Alternatively, various media conversion rules which have already been proposed are taken advantage of.

The linked contents presentation section 5 comprises a window display module 51 which reads the contents for presentation which have been created by the contents processing section 4 with an application 7 which corresponds to their data format and displays them in a pop-up window, and a window control module 53 which manages operation by the user for this pop-up window. It should be understood that the window display module 51 is provided with a function of automatically increasing or decreasing display magnification ratios, for example the font size of text or the image size, so that they accord with the display area of the window. By doing this, it becomes possible to browse the information relating to the linked contents with high efficiency even though the portion of the screen upon which this information is being displayed is small.

In this manner, with this first preferred embodiment of the present invention, the information in the linked contents which is displayed within the pop-up window is dynamically created by summarizing or editing the linked contents; and, furthermore, as a result of increasing or reducing the display magnification ratio according to the display area of the window, the user can easily and rapidly understand the information in the linked contents.

Next, a method for supporting browsing of linked contents will be explained using FIG. 4 through FIG. 9, and also referring to FIG. 3 as appropriate. The method which is explained below may be implemented using a computer with a computer program as a linked contents browsing support program. Furthermore, such a linked contents browsing support program may be recorded upon a recording medium.

Figure 4:
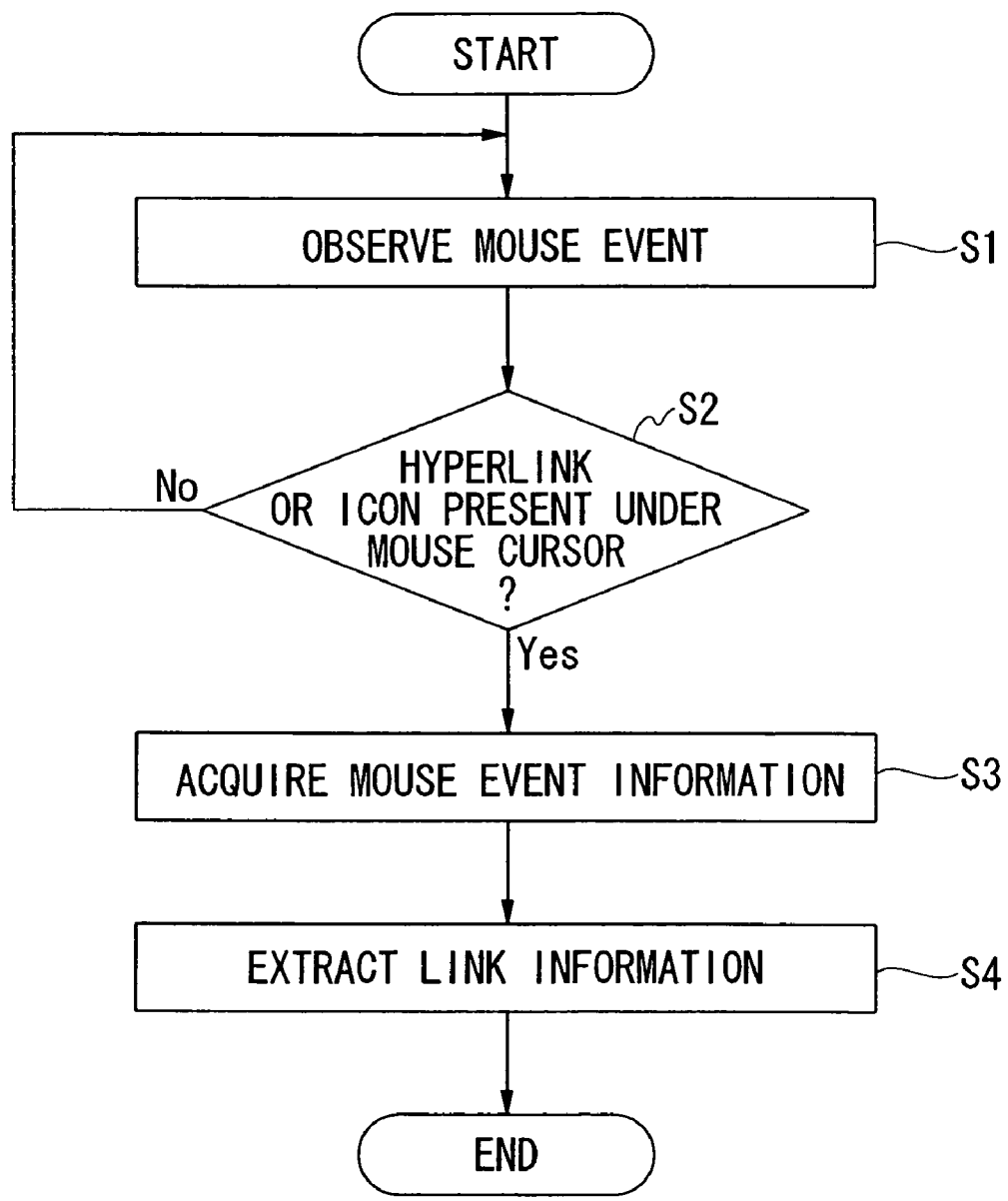
FIG. 4 is a flow chart showing the procedural flow of a mouse event observation section of the FIG. 3.

FIG. 4 is a flow chart showing the flow of a procedure which is executed by the mouse event observation section 2.

The flow of this procedure executed by the mouse event observation section 2 will now be explained using the flow chart of FIG. 4, while referring to FIG. 3.

In the mouse event observation section 2, the mouse event acquisition module 21 always observes mouse events as a result of mouse operation in a browser or upon a window (in a step S1).

When an event which shows that the mouse cursor has been put upon an anchor is acquired, in other words when it is detected that an anchor (a hyperlink) or an icon is present under the mouse cursor (YES in a step S2), then mouse event information which consists of the positional information for the mouse cursor within the browser or the window (for example, its coordinate values or the like) is acquired via the mouse event information acquisition module 21 (in a step S3).

After this, the link information extraction module 22 extracts the link information related to the anchor which is under the mouse cursor from the mouse event information which has been acquired (in a step S4). If the result of the decision in the step S2 is NO, then the flow of control returns to the step S1, and observation of mouse events is again performed.

The mouse event observation section 2 repeats the above described procedural flow as long as the mouse cursor is put on the anchor.

Here, as the anchor (the hyperlink), an anchor which is set to text or an image included in HTML document, or, an anchor which is set to each object within an image or a movie, may be considered; or, as an icon, an icon for a file or a folder which is being displayed within a window of Explorer or the like may be considered. In this case, the link information which is extracted by the link information extraction module 22 is the URL address which is designated by the anchor, the name of the file or the folder which is indicated by the icon), or is meta-data or the like which is indicated by the anchor or the icon or the like.

For example, when the link information extraction module 22 reads the source code of the HTML document contents on which the mouse cursor has been put, it converts this source code into a DOM (Document Object Model) structure using a DOM parser or the like which constructs an analysis tree, and obtains a display position for each tag element which is described in this HTML document contents.

Then, the anchor tag which is underneath the mouse cursor is detected by comparing the position information for the mouse cursor which has been acquired with the display position of each tag element which has been obtained.

Detection of the anchor tag is performed by acquiring information about the tag <a href="*"> to which the tag <a> indicating the anchor is affixed, using a character string search or a DOM parser or the like. At this time, the character string (the portion *) which is written in the tag <a href="*"> is the URL (Uniform Resource Locator) which is indicated by the anchor tag (<a href="*">), and this becomes the link information which is extracted by the link information extraction module 22.

By doing this, it is possible easily to extract the link information related to the anchor or the icon or the like which is located underneath the mouse cursor.

Figure 5:
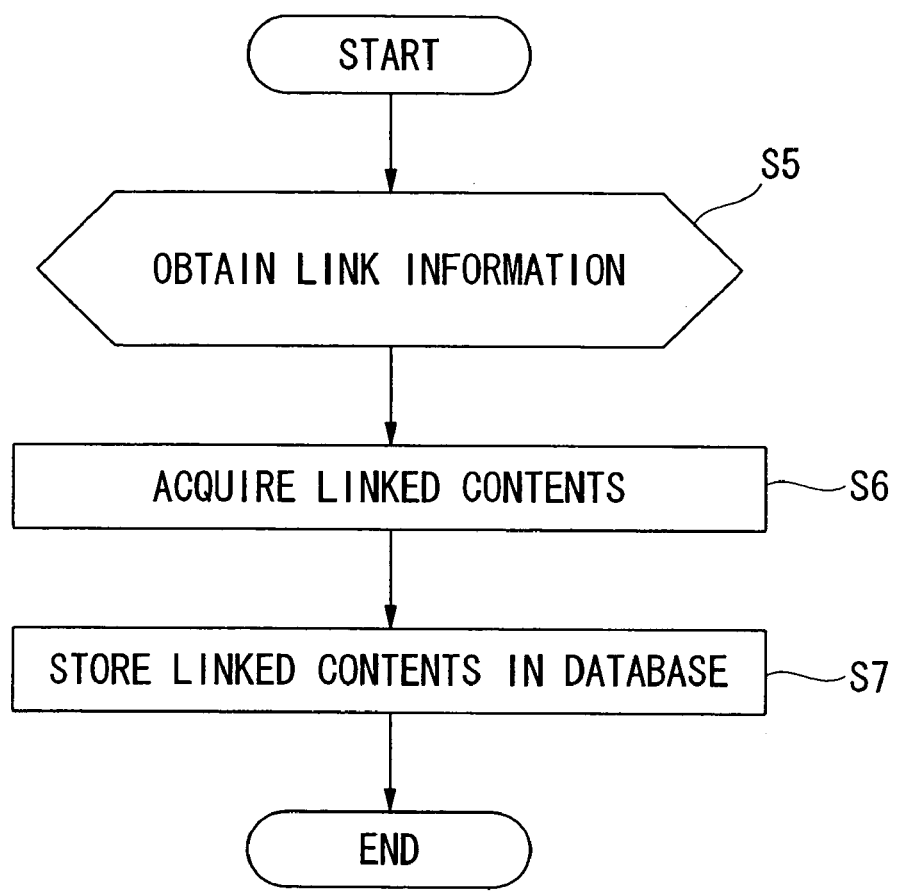
FIG. 5 is a flow chart for explanation of the procedural flow of a linked contents acquisition section of the FIG. 3.

FIG. 5 is a flow chart showing the flow of a procedure which is performed by the linked contents acquisition section 3.

The flow of this procedure executed by the linked contents acquisition section 3 will now be explained using the flow chart of FIG. 5, while referring to FIG. 3.

Link information from the mouse event observation section 2 is obtained by the linked contents acquisition section 3 (in a step S5), and the contents 6 which are designated by this link information are acquired by the linked contents acquisition module 31 (in a step S6).

The linked contents which have been acquired are stored in a linked contents database 32 (in a step S7).

At this time, as has already been explained, if the linked contents are online contents, then these contents are downloaded, and is stored; while on the other hand, if they are a file in the computer of the user, a copy of these contents is acquired, and is stored. Furthermore, if the link information which has been obtained is a folder icon, a list of the files within this folder is acquired as the linked contents, and is stored.

Here, in addition to HTML document, various possible contents 6 may be considered, such as text document, movie data, sound data, image data, or the like; and, if these contents 6 include any linked information, the linked contents acquisition section 3 also acquires the information related to the linked destination which is connected to these contents.

In this manner, even without performing a setting so as to pop-up display the linked contents in advance to each anchor or icon or the like, it is possible easily to acquire the information in the linked contents by performing mouse movement so as to put the mouse cursor on the anchor or the icon or the like.

Figure 6:
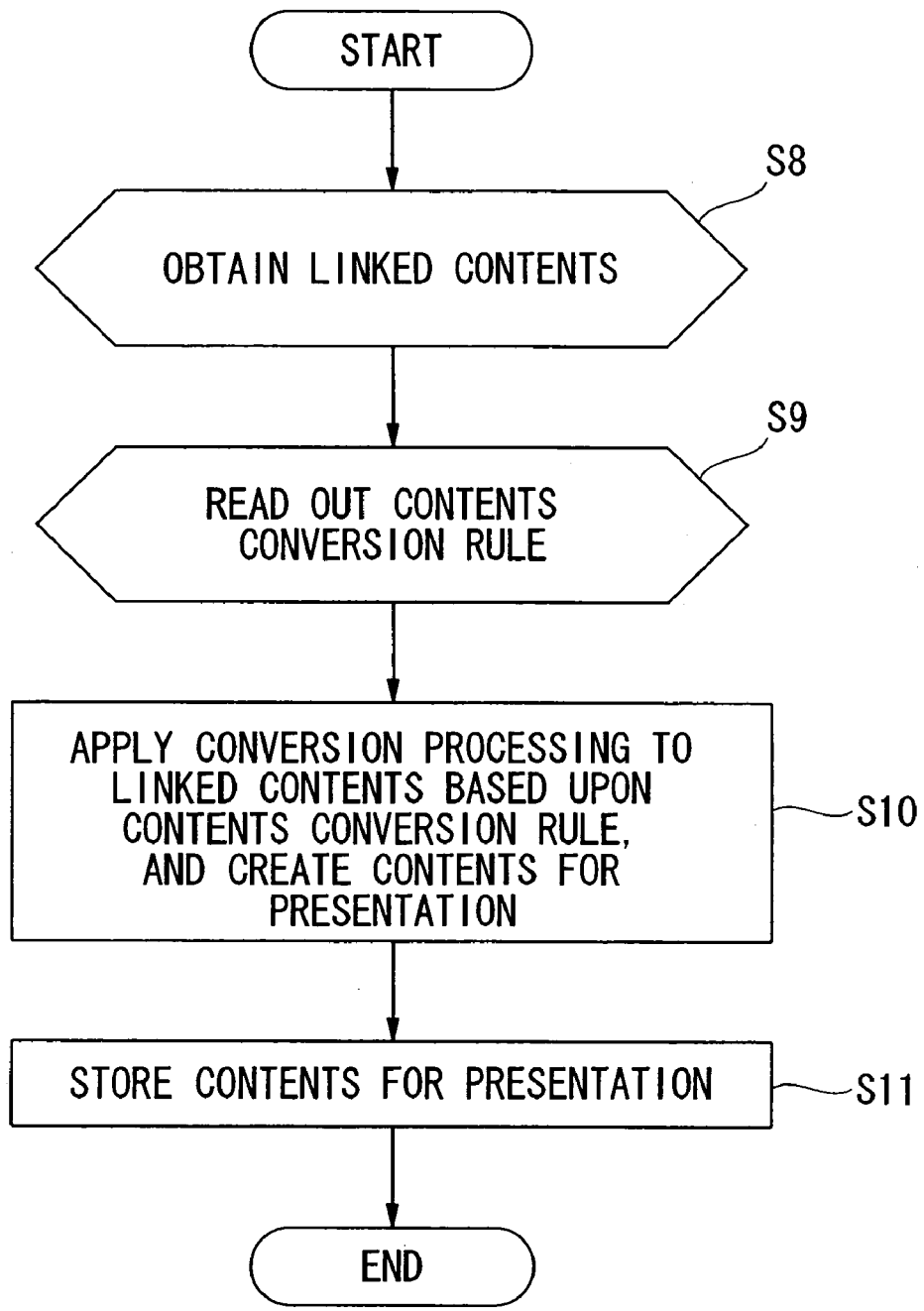
FIG. 6 is a flow chart for explanation of the procedural flow of a contents processing section of the FIG. 3.

FIG. 6 is a flow chart showing the flow of a procedure which is executed by the contents processing section 4.

The flow of this procedure executed by the contents processing section 4 will now be explained using the flow chart of FIG. 6, while referring to FIG. 3.

The contents processing section 4 comprises one or more contents conversion rules 41 for conversion processing the contents which have been acquired into various display formats or styles; and the linked contents which have been acquired by the linked contents acquisition section 3 are read by a processing module 42 (in a step S8), an appropriate contents conversion rule 41 is read (in a step S9), conversion processing is applied to the linked contents based upon the contents conversion rule 41, and contents for presentation are created (in a step S10). These contents for presentation are stored in a contents for presentation storage memory 43 (in a step S11).

Here, the contents conversion rule 41 can be selected by the user himself via the input device 1. On the other hand, it would also be acceptable for the contents processing section 4 to select such an appropriate contents conversion rule 41 automatically, according to the state of the current window (the number of pop-up windows or the pop-up window display size), or according to the contents thereof.

Here, for the contents conversion rule 41, a rule according to which the linked contents should be copied just as they are in order to produce the contents for presentation will be acceptable; or, alternatively, a rule will also be acceptable, according to which the contents for presentation should be obtained by summarizing or editing the linked contents. Furthermore, it will also be acceptable to take advantage of various types of media conversion rules which have already been proposed. Certain concrete examples of the details of such contents conversion rules 41 will be described hereinafter in this specification under the heading "Contents Conversion Rules".

Figure 7:
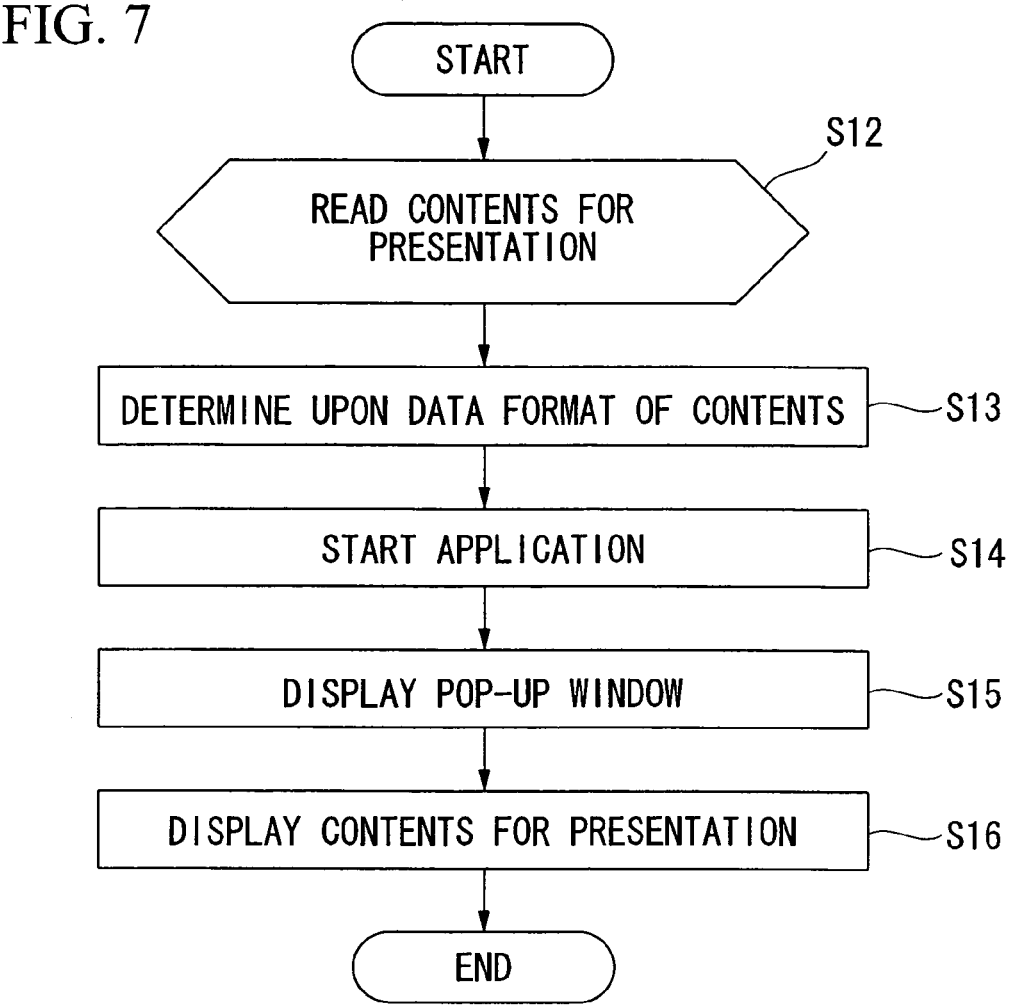
FIG. 7 is a flow chart showing a procedural flow for displaying contents for presentation, in this first preferred embodiment of the present invention.

FIG. 7 is a flow chart showing the flow of processing which the window display module 51 executes in order to display the contents for presentation. The contents for presentation which have been created by the contents processing section 4 are read by the window display module 51 (in a step S12); the data format of these contents for presentation is determined upon (in a step S13), for example from their file extension; and an application 7 which should be started is identified and this application 7 is started (in a step S14). A pop-up window is then displayed at the position at which the mouse cursor is located (in a step S15), and the contents for presentation are displayed in this pop-up window using the application 7 (in a step S16). For example, if the contents for presentation is HTML document, a web browser is started; if the contents for presentation is an image file, an image viewer is started; if the contents for presentation is a movie file, a movie player is started; and in each case the contents for presentation are displayed in a pop-up window.

It is possible for the user to apprehend the information in the linked contents at high efficiency, even if he is using a small screen, since the display magnification ratio provided by the window display module 51 can be changed to agree with the display area of the pop-up window.

Figure 8:
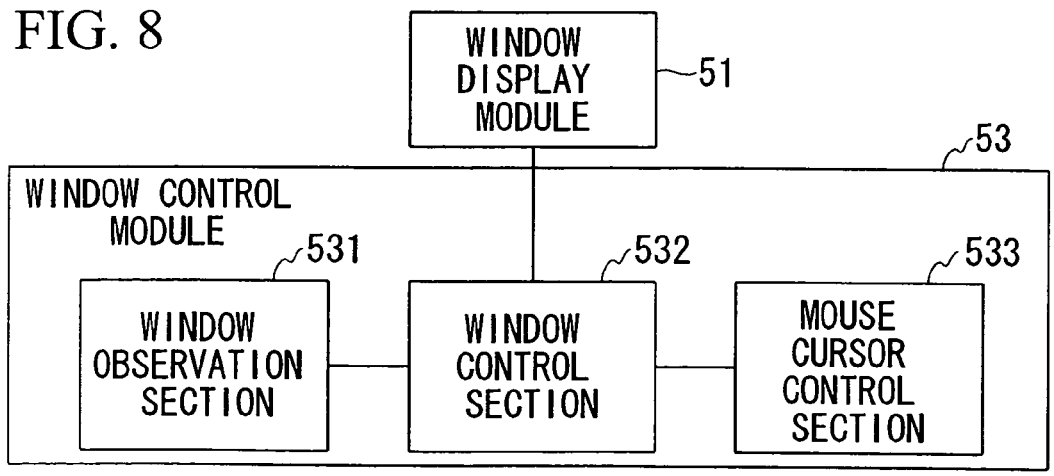
FIG. 8 is a block diagram showing the structure of a window control module of the FIG. 3.
Figure 9:
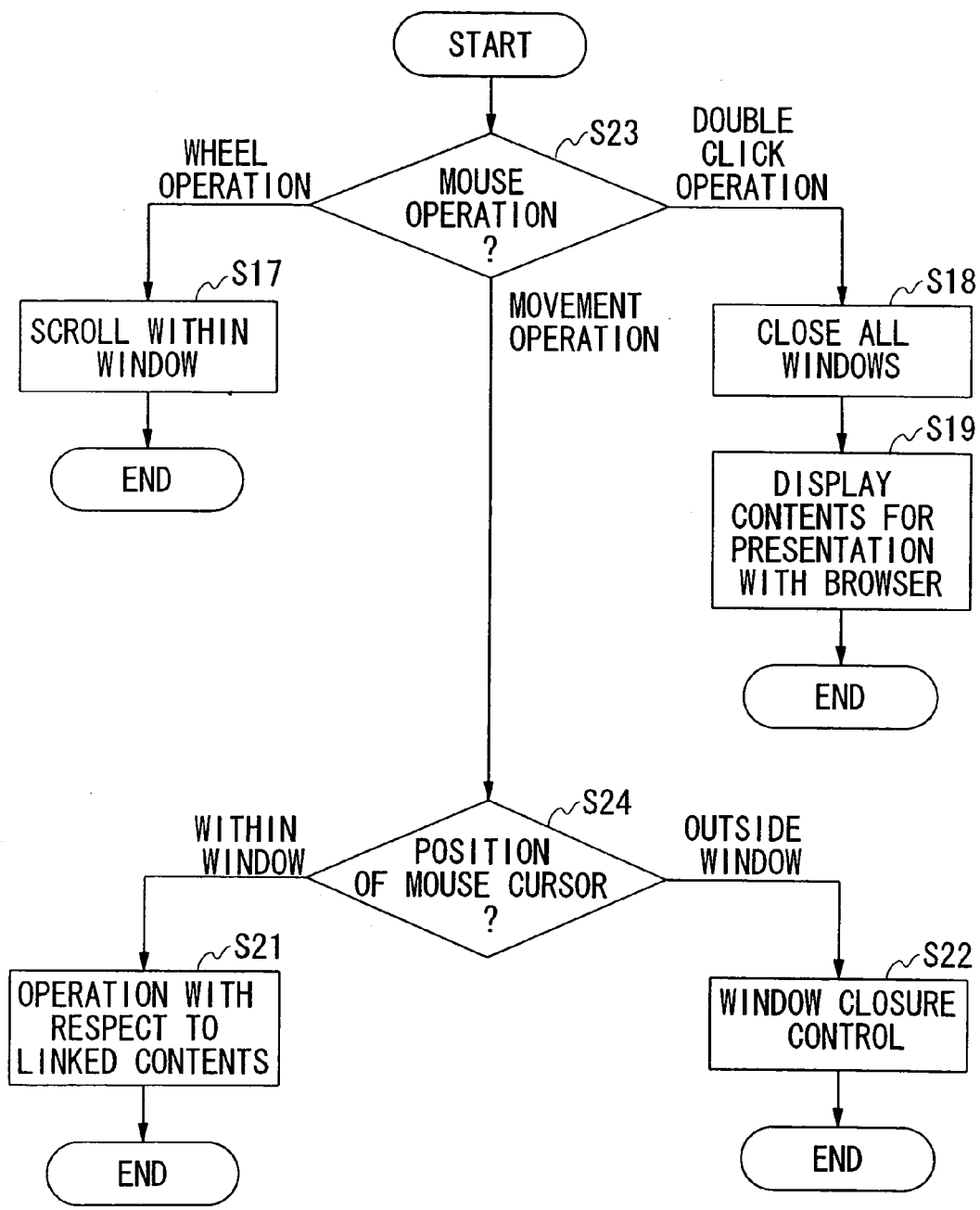
FIG. 9 is a flow chart showing a procedural flow for display control of pop-up windows, in a window control module shown in FIG. 1.

FIG. 8 is a block diagram showing the structure of the window control module 53, while FIG. 9 is a flow chart showing the flow of a procedure which is executed by the window control module 53 for display control of pop-up windows.

The flow of this procedure executed by the window control module 53 for pop-up window display control will now be explained using the flow chart of FIG. 9, while referring to FIG. 8.

First, a window observation section 531 observes a mouse event related to an operation by the user with respect to a pop-up window (in a step S23).

Next, a window control section 532 controls the display of a pop-up window, based upon a mouse event which has been acquired by the window observation section 531.

Specifically, if the user has performed some mouse operation upon the screen, and this mouse operation was rotation of a wheel of the mouse (wheel operation in a step S23), then scrolling of the contents for presentation within the pop-up window (the active window) is performed according to the rotation of the wheel (in a step S17).

If the mouse operation was double clicking of the mouse (double click operation in the step S23), then all of the pop-up windows which currently are being displayed are closed (in a step S18), and the contents for presentation which was being displayed within the pop-up window for which the double click operation was generated are displayed at normal size within a window which is newly opened by an application such as a browser or the like (in a step S19). As the object to be displayed, the contents for presentation is not the only possibility; it may also be envisaged to read the original linked contents from the linked contents database 32 and to display the original linked contents. In this case, the procedure when this double click operation occurs consists of the action in a conventional browsing environment which displays the corresponding linked contents by clicking upon an anchor or an icon or the like. Furthermore, the operation of double click operation is not the only possibility; it would also be acceptable to perform the above described operational procedure when some other operation which is determined in advance takes place, such as right click operation of the mouse, or operation via the keyboard (such as pressing the return key), or the like.

Furthermore, if the user has performed some mouse operation upon the screen, and this mouse operation was mouse movement operation (movement operation in the step S23), then the flow of control proceeds to a step S24.

In this step S24, if the position to which the mouse cursor has been moved is within this pop-up window (the active window) ("within window" in the step S24), this is interpreted as operation (the step S21) with respect to the contents for presentation which are being displayed within the pop-up window, and the anchor within this pop-up window is made selectable.

Figure 10:
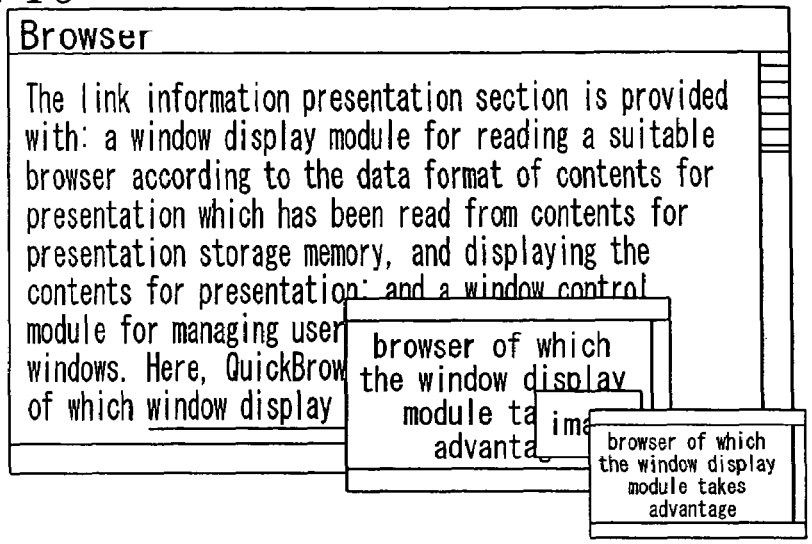
FIG. 10 is a figure showing a nest structure of pop-up windows, in this first preferred embodiment of the present invention.

When the user puts the mouse cursor upon the anchor within the contents for presentation which are being displayed within this pop-up window, as shown in FIG. 10, a new pop-up window is displayed so as to overlap with the present pop-up window, and the linked contents (actually, the contents for presentation) which is designated by the anchor are displayed within this new pop-up window (in the step S21).

On the other hand, if the position to which the mouse cursor has been moved is somewhere else than the pop-up window ("outside window" in the step S24), then the pop-up window is closed (in a step S22), and the system returns to the state before browsing. Here, as previously described, if a new pop-up window (child window) is being generated from the pop-up window (parent window), the region for deciding whether or not to close the parent window is extended to the region in which the child window is included. As a result, the pop-up window which becomes the parent window is always displayed while the pop-up window which is to become the child window is being displayed.

In this manner, it is possible quickly to return to the state before browsing or the like, by performing management of operation by the user at the time that the pop-up window is displayed.

Contents Conversion Rules

Next, the details of concrete examples of the contents conversion rules 41 which are included in the content processing section 4 will be explained.

As the simplest possible contents conversion rule, for example, there may be proposed a rule according to which the linked contents are copied just as they are without alteration, in order to produce the contents for presentation. Furthermore, if the linked contents consist of text information, it may be considered to generate a summary by performing syntax analysis of the linked contents, or by extracting and presenting some specified portion. For example, if the linked contents are HTML document, it may be considered to pick out a title which is surrounded by tags <h1> to <h6>, or text which is put into bold face by being surrounded by <b> tags and to create a summary, or to extract anchor portions which are surrounded by <A> tags and to create an anchor list for the linked contents, or to extract only the image portions which are surrounded by <img> tags and to create a list of images for the linked contents, or the like.

Figure 11:
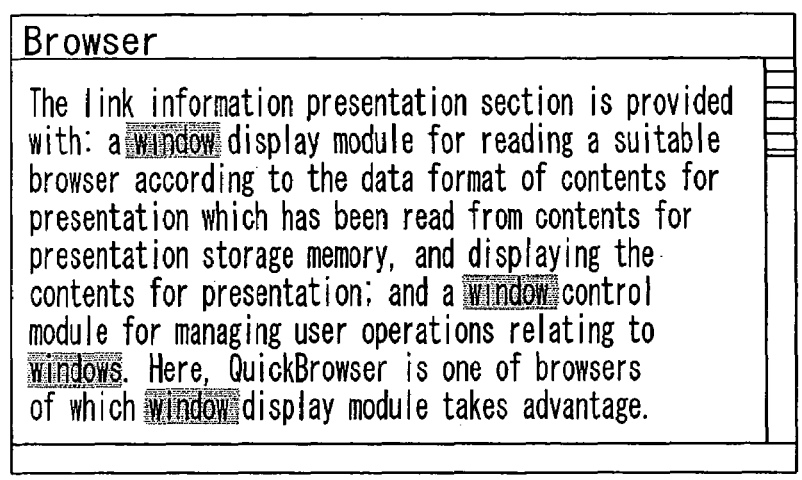
FIG. 11 is a figure showing an example of highlighted display of a keyword, in this first preferred embodiment of the present invention.

In addition, when some key word is searched for with a search engine, and the contents of the respective search results are browsed from a page upon which a list of the search results produced is displayed, as shown in FIG. 11, it may be considered to display as highlighted the key word portions in the linked contents (in this example, the key word being "window"), to cut out text which includes the key word, or text or images in the vicinity of the key word, or to process the linked contents.

Figure 12:
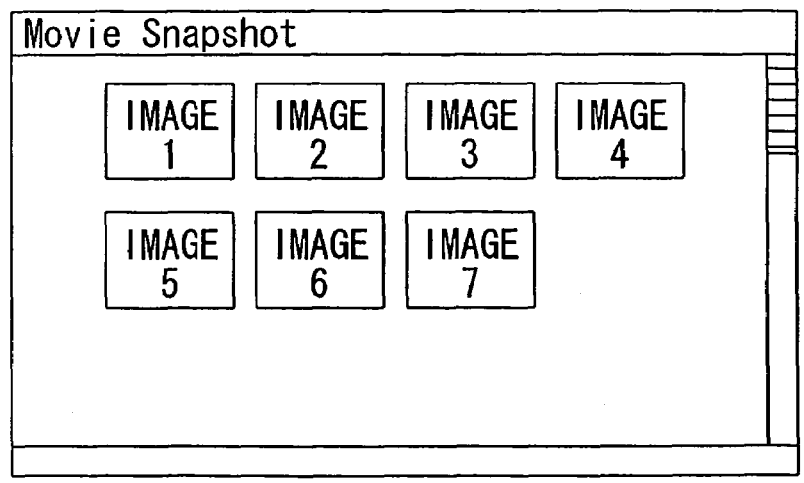
FIG. 12 is a figure showing a summarized display example of movie contents, in this first preferred embodiment of the present invention.

Moreover, if the linked contents are a movie, it may be considered to divide the movie into shots, and then to present, as a summary of the movie contents, a list of representative images, one for each shot (refer to FIG. 12). Furthermore, if the linked contents are sound, it may also be considered to present an introductory portion or a finale portion of the sound data as summary of these sound contents.

Furthermore, by, when performing the pop-up display, displaying information of the linked contents within a pop-up window after having changed the mouse cursor which is selecting an anchor or icon or the like into the pop-up window so as to animate it, and thereby it becomes clearly understood which anchor or icon or the like is the one to which the information of the contents within that pop-up window corresponds. Accordingly understanding by the user is facilitated.

Furthermore, if the linked contents are a movie or sound, a rule would also be acceptable in which sound extraction and text conversion processing is performed so as to convert it into text contents, with the converted contents being taken as the contents for presentation. In addition, if, for example, the linked contents are described in English, a rule would also be acceptable in which it was translated into Japanese by using a translation engine, with the translated contents being taken as the contents for presentation.

In this manner, it is possible to display (to present) various types of contents of presentation, according to the current window state, by providing changes according to various manners of summarizing or editing the linked contents. Accordingly, it is possible to display contents for presentation which the user can browse easily according to the current window state. Therefore, it is possible to make browsing of the contents by the user easier, even if multiple pop-up windows are being displayed, or if the display size of the pop-up window is small.

The present invention is not limited to the preferred embodiment which has been described above, and various changes to the preferred embodiment are possible, provided that the scope of the gist of the present invention is not departed from.

Since, with the present invention, it is not necessary to perform setting in advance in order to perform pop-up display for an anchor or an icon or the like, accordingly, along with the burden imposed upon the producer for providing the pop-up display being eliminated, it is also possible to append the pop-up display function even to already existing contents, for which no setting for pop-up display has been established.

For example, if a large number of anchors are present within a page, such as a home page upon which a list of search results which have been produced by a search engine have been displayed, or a home page which has displayed news headlines, then it is possible to find the desired information very quickly by taking advantage of the present invention, since it is possible quickly to browse each of the linked contents in turn with simple operations.

In addition, for example, if the present invention is applied to a home page which displays as thumbnail images a list of images which are stored in a database such as an image album or an image archive or the like, and in which by clicking upon one of these thumbnail images, the system moves to a page upon which the clicked thumbnail image has been displayed at normal size, the user can see any image which he wishes almost instantaneously via a pop-up window with the view of thumbnail images continuing to be displayed. Accordingly, he can browse the images with high efficiency.

Furthermore, if the present invention is applied to a document, for example a manual or a reference, in which a detailed explanation, an elucidation of a term, an annotation or the like of some text or word, to which an anchor is set, is displayed separately, it is possible to pop-up display the linked contents near the original text or word. Accordingly, there is no hindrance to the user in his continuous reading of the main text, and, it is possible for him to efficiently understand the contents while he refers to the additional information.

Second Preferred Embodiment

Figure 13:
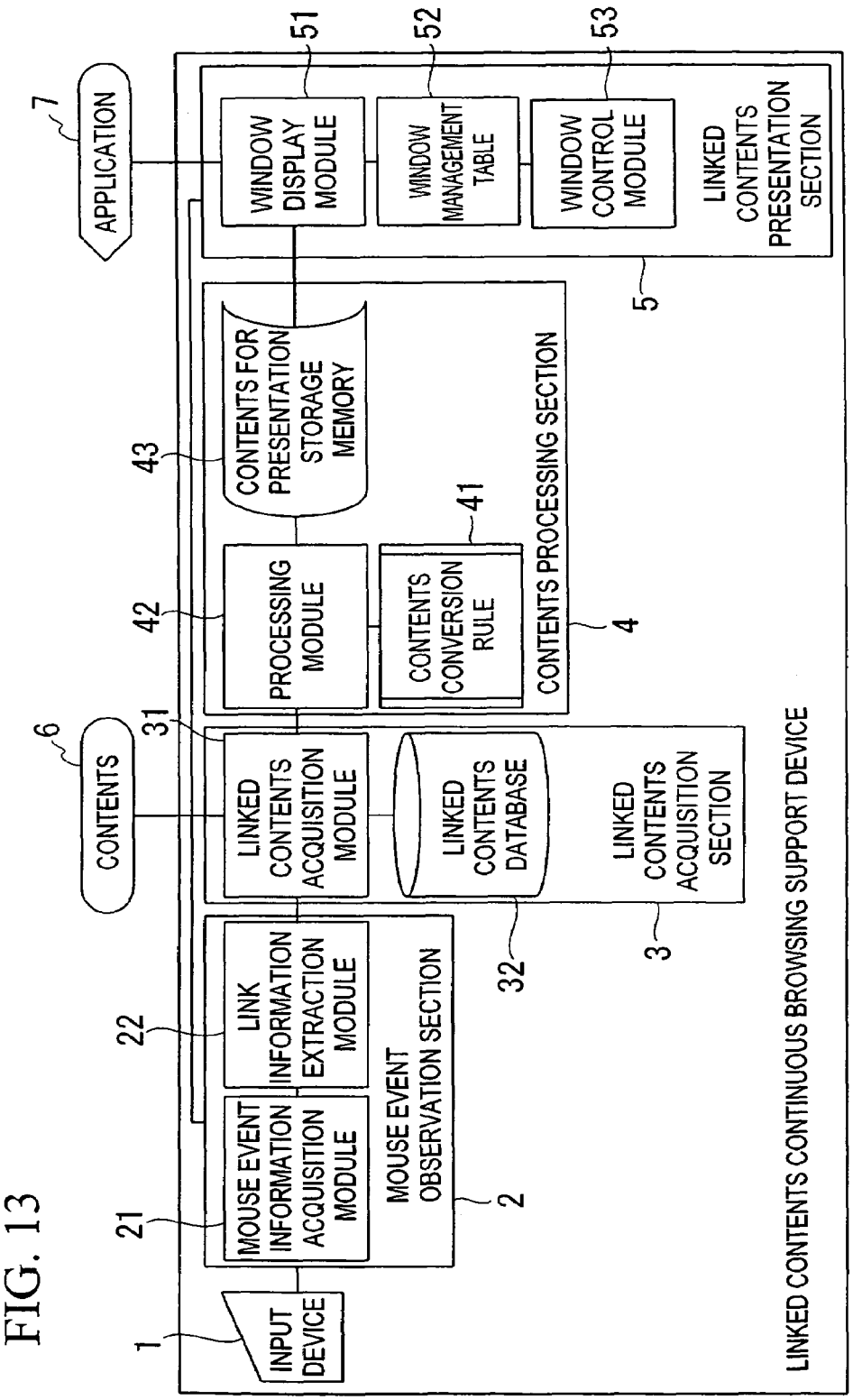
FIG. 13 is a block diagram showing the structure of a continuous browsing support device for linked contents, according to a second preferred embodiment of the present invention.

FIG. 13 is a block diagram showing the structure of a linked contents continuous browsing support device according to a second preferred embodiment of the present invention. Since this second preferred embodiment is one in which certain functions have been supplemented to the first preferred embodiment described above, accordingly, in FIGS. 13 through 25 of this second preferred embodiment, for structural elements which correspond to ones shown in FIGS. 1A through 12 described with regard to the first preferred embodiment, the same reference symbols are used, and the description thereof will be curtailed. In the following, the explanation will focus upon the elements which are unique to this second preferred embodiment.

Just as in the case of the first preferred embodiment as shown in FIG. 3, this linked contents continuous browsing support device (hereinafter abbreviated as "continuous browsing device") comprises an input device 1, a mouse event observation section 2, a linked contents acquisition section 3, a contents processing section 4, and a linked contents presentation section 5; and contents 6 are set as linked contents, with an application (a software program) 7 which is used to display these linked contents being provided separately.

In the following description, in the same way as in the case of the first preferred embodiment described above, the explanation will assume that the input device 1 is a mouse, and that input operation for requesting the display of linked information and for requesting closing of a window is performed by mouse movement operation or by mouse clicking operation.

FIGS. 14A through 14C are figures showing examples of presentation (display) screens which are presented to the user by the continuous browsing device of this second preferred embodiment of the present invention.

First, an outline of the operation of the continuous browsing device will be explained using the screens of FIGS. 14A through 14C as examples.

The user puts the mouse cursor 113 on an anchor (an object) 111 contained in the HTML document which is displayed in the browser 112 (refer to FIG. 14A).

Taking this operation as a trigger, a new pop-up window 115 is displayed, and contents for presentation which correspond to the linked contents indicated by the anchor 111 are displayed within this pop-up window 115 (refer to FIG. 14B).

Subsequently, when the user puts the mouse cursor on an anchor (an object) 125 within these linked contents which has been displayed in the pop-up window 115, a new pop-up window 126 is displayed, and contents for presentation which corresponds to the linked contents indicated by the anchor 125 is displayed within this pop-up window 126 (refer to FIG. 14C).

The display position of the pop-up window 115 is determined to be a position which does not hide the entire anchor 111, in other words, a position in which the entire anchor 111 still appears, or a position in which at least a part of the anchor 111 still appears.

FIGS. 15A through 15C are figures showing examples of presentation (display) screens which are presented to the user when the continuous browsing device according to this second preferred embodiment of the present invention is applied to software which manages files.

The operation of this continuous browsing device as applied to software which manages files will be explained using the screens of FIGS. 15A through 15C as examples.

First, when a folder icon 213 is being displayed within a window 211 of an item of software (Explorer or the like) which manages a large number of files, the user puts the mouse cursor 214 upon this folder icon 213 (refer to FIG. 15A).

Taken this operation as a trigger, a new pop-up window 216 is displayed, and a list of the files which are present within the folder denoted by this folder icon 213 is displayed within this pop-up window 216 (refer to FIG. 15B).

Subsequently, by the user putting the mouse cursor 214 on a file icon 225 displayed within this pop-up window 216, a new pop-up window 226 is displayed, and contents for presentation which show the contents of this file icon 225 are displayed within this pop-up window 226 (refer to FIG. 15C).

In the above, an outline of the operation of the continuous browsing device according to this second preferred embodiment of the present invention has been explained.

Although, in the foregoing explanation, the description focused upon an anchor as the object which had a linked destination, and upon HTML document as such linked contents, it would also be possible to implement continuous browsing of linked contents in the same manner, if the object which had a linked destination were to be an icon.

Figures 16, 17:
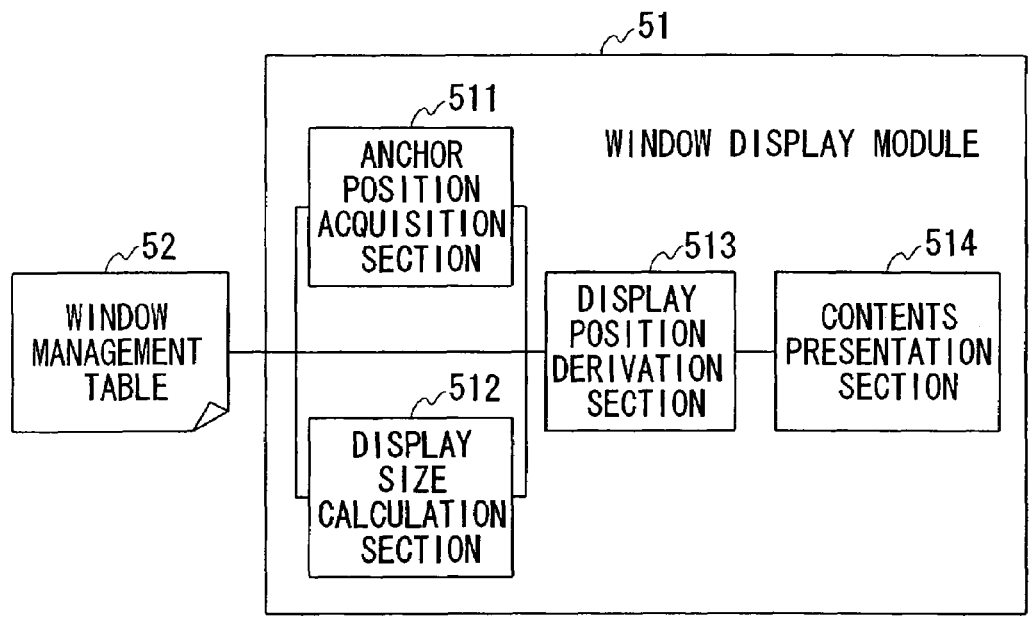
FIG. 16 is a figure showing an example of a window management table of FIG. 13.
FIG. 17 is a block diagram showing the structure of a window display module of FIG. 13.

FIG. 16 is a figure showing an example of a window management table 52 which is additionally provided to this second preferred embodiment of the present invention.

As shown, for example, in FIG. 16, the window management table 52 of the linked contents presentation section 5 comprises an "anchor position" which specifies the display position within a window of an anchor (an object) in relation to which an information display request has been generated by putting the mouse cursor or the like on the anchor; a "display position" which specifies the display position upon a screen (upon the screen of an information device or the like) of a window which displays the contents for presentation which correspond to the anchor; a "display size" which specifies the display size of this window; and a "display direction" which specifies the display direction of this window.

Furthermore, the window management table 52 stores the display order of the contents for presentation. In other words, it also includes a window number (the number in the column "window" in FIG. 16) which indicates the display order upon the screen for the pop-up windows which display the contents for presentation.

At this time, "display position" denotes the coordinates of the upper left corner of the window upon the screen, and "anchor position" is the coordinates (the relative coordinates) of the central position of the anchor, with the upper left corner of the window in which the anchor is displayed being taken as (0,0).

In the window management table 52, the window for which "window" is equal to 1 is the window in which the browser is operating. In other words, the "display position" for the window "1" is the display position upon the screen of the browser, while the "size" is the display size of the browser; and these values are updated by the window display module 51 in accordance with changes in the position and/or the size of the browser.

In this connection, the "display direction" of the window "1" is the initial value which is used for derivation of the display position of a window which is pop-up displayed from this window.

The derivation of the display position of this pop-up window will be described in detail hereinafter in connection with the explanation of the window display module 51.

Furthermore, in the window management table 52, the window for which "window" is equal to 2 is the window which has been pop-up displayed from the anchor which is located at (200,100) within the window "1", in other words it is the second window; and the display position of this second window is "(320, 210)" and the display size of this second window is "420*280", and moreover it is displayed in the direction "315" (in degrees) from the window "1", while the anchor within this second pop-up window for which an information display request is generated is shown as being at (200,200) within this window.

It should be understood that, by way of example, the display position and the display size are shown as being measured in units of pixels.

Furthermore it is acceptable, when the mouse cursor is put on the anchor, for the window display module 51 to obtain an empty region upon the screen based upon the position upon the screen of the anchor on which this mouse cursor is put, and to derive the display direction in which this empty region is maximized. By doing this, it becomes possible to take advantage of the display region upon a screen of limited size in the most efficient manner.

Figure 18:
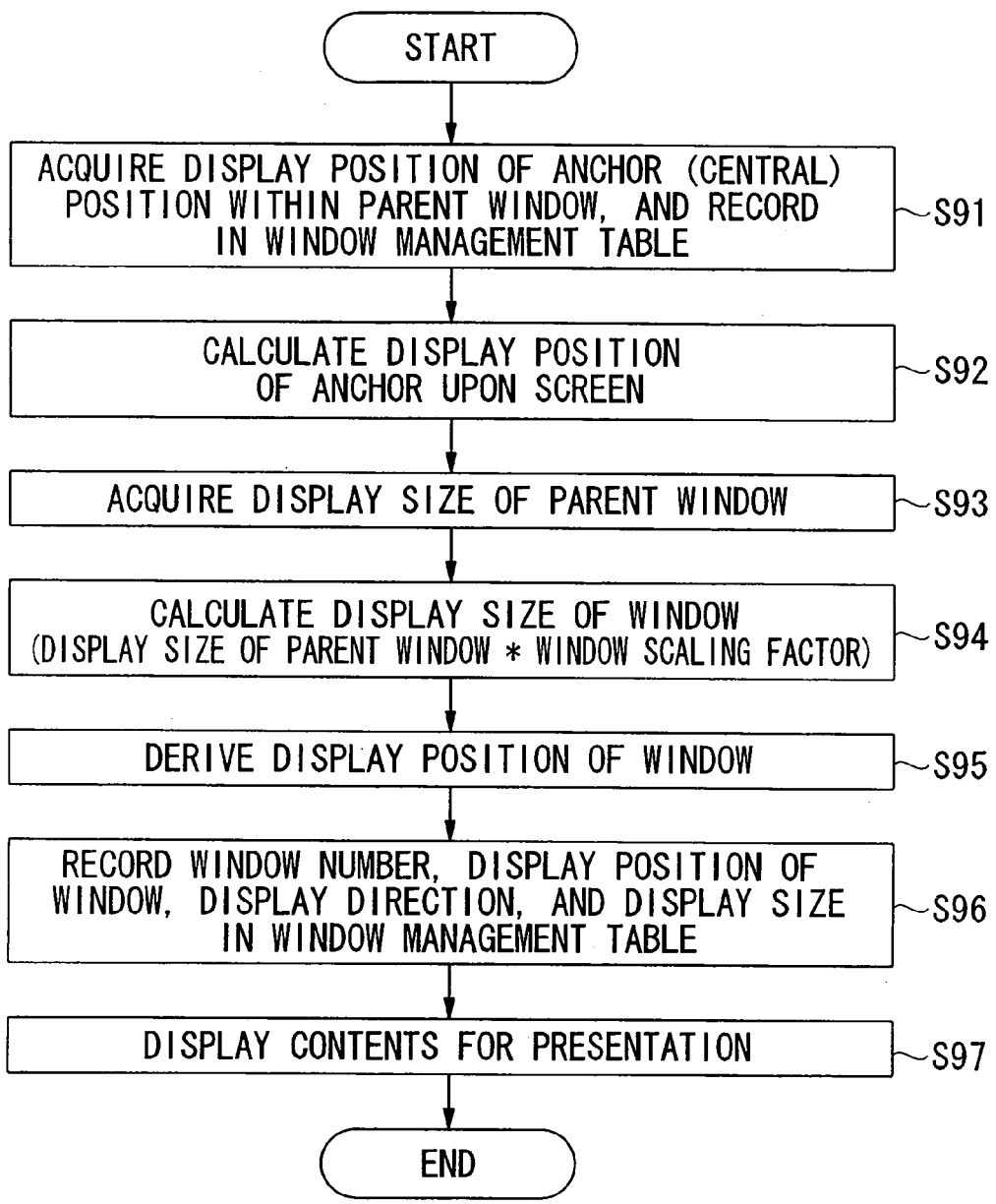
FIG. 18 is a flow chart for explanation of the procedural flow of the window display module of FIG. 13.

FIG. 17 is a block diagram showing the structure of a window display module 51, while FIG. 18 is a flow chart showing the flow of a procedure which is executed by this window display module 51.

The flow of this procedure executed by the window display module 51 will now be explained using the flow chart of FIG. 18, while referring to FIG. 17.

First, the anchor position acquisition section 511 acquires the display position of the anchor (the object), for which an information display request has been generated by mouse operation or the like by the user, as a display position within a window (hereinafter termed the "parent window") for displaying this object.

Subsequently, it records the display position within this parent window in "anchor position" in the window management table 52. At this time, it acquires (in a step S91) the central position of the anchor as the display position of the anchor.

Next (in a step S92), it acquires the display position of the parent window itself from the column "display position" in the window management table 52, and calculates the display position of the anchor for which the information display request has been generated upon the screen of the information device, based upon the "anchor position" which it has acquired.

The procedure in this step S92 will be described in detail hereinafter by using a concrete example.

Next (in a step S93), the display size calculation section 512 refers to the window management table 52, and acquires the display size of the parent window in which the anchor (the object) for which the information display request has been generated is displayed.

Subsequently (in a step S94), by multiplying the display size of the parent window which has been acquired by a window scaling factor, it calculates the display size of a pop-up window in which to display the contents for presentation.

It should be understood that the window scaling factor is a value for calculating the display size of the pop-up window, and it is set in advance by a predetermined procedure.

At this time, if the window scaling factor has been set to a value which is less than unity, then the pop-window in which the contents is to be displayed is demagnified in a stepwise manner. On the other hand, if the window scaling factor has been set to a value which is greater than unity, then the pop-window is magnified in a stepwise manner; while, if the window scaling factor has been set to unity, then the pop-up window is always displayed at the same size.

Furthermore, if the parent window in which the anchor for which the information request has been generated is displayed is a browser, it would also be acceptable to make the window scaling factor which is utilized at this time to be smaller than the window scaling factor which is utilized subsequently.

In other words, it would be acceptable, for example, to set the size of a pop-up window in which pop-up display is initially performed from the browser to be much smaller as compared with the size of the browser, while on the other hand displaying a new pop-up window in which pop-up display is performed from this pop-up window at roughly the same size as this pop-up window. If the scaling factor is determined in this manner, it becomes possible for the user easily to browse each pop-up window (actually the contents for presentation) even when a large number of pop-up windows are being displayed. Accordingly, it is possible to enhance the efficiency of the continuous browsing of the linked contents.

The display position derivation section 513 derives (in a step S95) the display position of the pop-up window upon the screen, based upon the position upon the screen of the information device of the anchor which has been acquired by the anchor position acquisition section 511, the display size of the pop-up window which has been calculated by the display size calculation section 512, and the display direction of the parent window which is acquired from the window management table 52.

Subsequently, it records (in a step S96) the value which has been calculated by adding 1 to the window number of the parent window which is stored in the window management table 52, the display position, the display direction, and the display size of the pop-up window which have been derived, respectively, under "window", "display position", "display direction", and "size" of the window management table 52.

It should be understood that the details of the process of derivation of the pop-up window display position in the step S95 will be explained hereinafter by using a concrete example.

Next (in a step S97), the contents presentation section 514 displays a pop-up window of the display size which was calculated in the step S94 upon the screen in the display position which was derived in the step S95, and displays the contents for presentation which have been created by the contents processing section 4 within this pop-up window, using the application 7.

At this time, it is anticipated that the contents will be displayed in accordance with change of the display size of the window in a stepwise manner, by changing the display magnification ratio for the contents which are presented in accordance with the display size of the pop-up window.

Next, the procedure of calculation (in the step S95) of the display position upon the screen of the information device (hereinafter simply termed the screen) of the anchor (the object) for which the information display request has been generated, which is performed by the anchor position acquisition section 511, will be explained with reference to FIG. 19.

Figure 19:
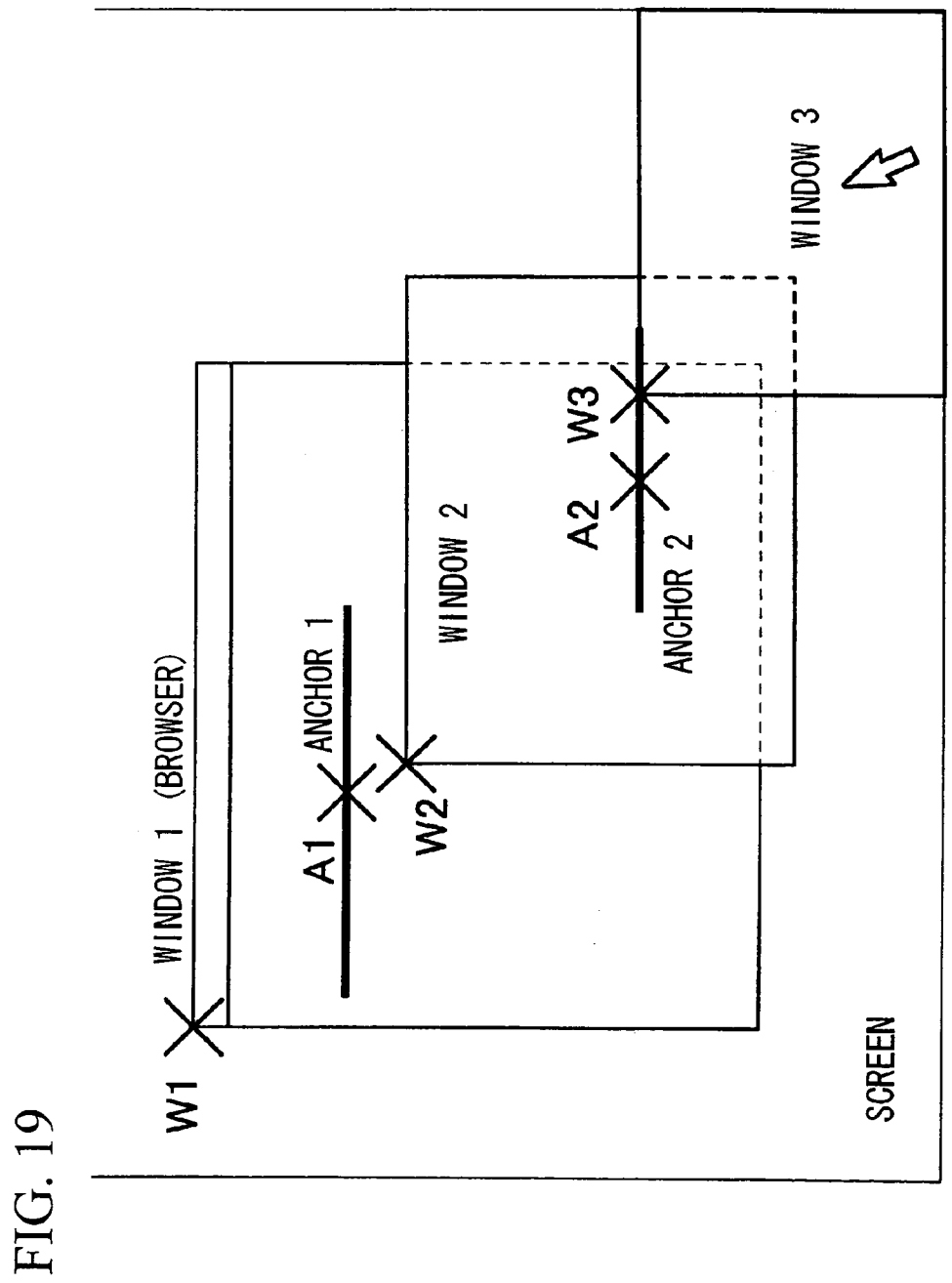
FIG. 19 is a figure for explanation of a procedure by which, based on the display position of an anchor within a window, an anchor position acquisition section of FIG. 17 calculates the display position upon the screen of this anchor.

FIG. 19 is a figure for explanation of the procedure for calculation of the display position upon the screen of an anchor "1" based on the display position of this anchor "1" within a window "1".

As shown by way of example in FIG. 19, if the display position W1 of the window "1" (the browser) upon the screen is (X1, Y1), and the display position A1 of the anchor "1" within the window "1" is (x1, y1), then the display position A1 of the anchor "1" upon the screen is (X1+x1, Y1+y1).

In the same manner, if the display position W2 of the window "2" upon the screen is (X2, Y2), the display position A2 of the anchor "2" within the window "2" is (x2, y2), and if the window scaling factor is $\alpha$, then the display position A2 of the anchor "2" upon the screen is (X2+$\alpha$*x2, Y2+$\alpha$*y2).

Figure 21:
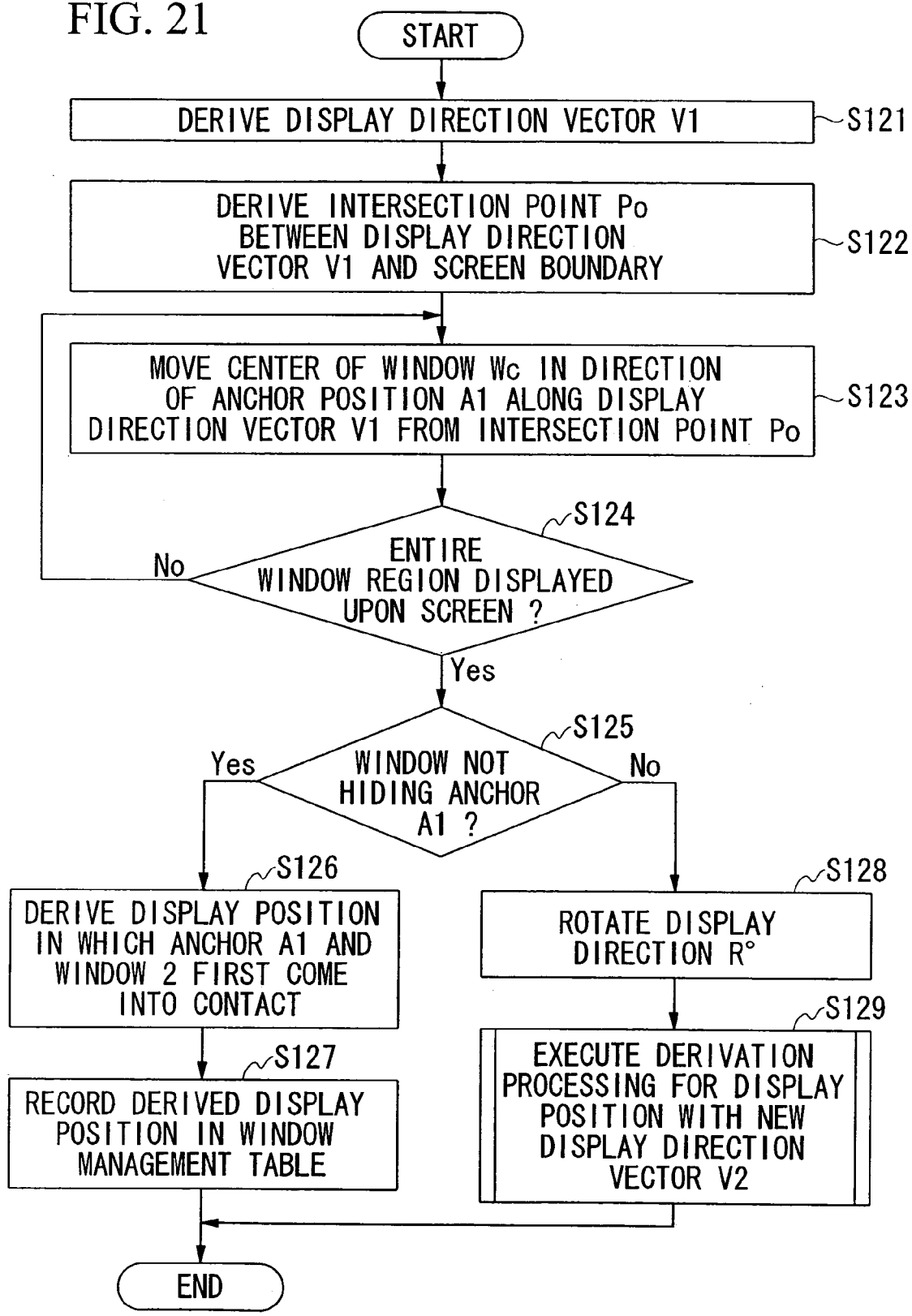
FIG. 21 is a flow chart showing a procedural flow performed by a window display module of FIG. 17 for derivation of the display position of a pop-up window.

FIGS. 20A through 20D are figures showing the flow of a procedure which is performed by the display position derivation section 513 for the derivation of the display position of the pop-up window; and, in particular, FIG. 21 is a flow chart showing the flow of a procedure which is performed by the display position derivation section 513 for deriving the display position of the pop-up window.

The procedural flow which is performed by the display position derivation section 513 for deriving the display position of the pop-up window will now be explained using the flow chart shown in FIG. 21, while referring to FIGS. 20A through 20D.

First, the display position derivation section 513 derives (in a step S121) a display direction vector V1 (a direction line which has been set in advance), taking as origin the anchor position A1 which has been acquired by the anchor position acquisition section 511, and taking the display direction of the parent window (window 1) which is stored in the window management table 52 as the rotational component.

Next (in a step S122), it derives the intersection point $P_0$ between the display direction vector V1 which it has derived and the boundary of the screen (refer to FIG. 20A).

Subsequently, the position at which the entire region of the window "2" for displaying the contents for presentation is to be displayed (i.e., the position of its central position Wc) upon the screen is detected (in steps S123 and S124) by moving the central position Wc of the window "2" by a predetermined distance in the direction of the anchor position A1 along the display direction vector V1 from the intersection point Po which has been derived (refer to FIG. 20B).

In other words, assuming that each point upon a predetermined direction line, i.e., the vector V1 is taken as the central position of the pop-up window, a point is detected from among the points upon this line at which the entire region of this pop-up window is displayed upon the screen of the information device.

Subsequently, the display position derivation section 513 checks the positional relationship of the window "2" and the anchor A1, and, if the window "2" is not overlapped with the anchor A1, in other words, if the window "2" does not hide the anchor A1 (YES in a step S125), then the central position Wc of the window "2" is further moved in the direction of the anchor position A1, and the position in which the anchor A1 and the edge portion of the window "2" come into mutual contact for the first time is derived (in a step S126); and this display position which has been derived is taken as the display position for the window "2", and is recorded in the window management table 52 (in a step S127).

On the other hand, if in the procedure of the step S125 the window "2" is hiding the anchor A1 (NO in the step S125), then the display direction of the window is shifted by a predetermined angle, in other words is rotated by a predetermined amount R° (in a step S128), and the procedure from the step S122 is executed again with the new display direction vector V2 (in a step S129) (refer to FIG. 20C).

Subsequently, the procedure of derivation of a display position by rotating the display direction by the predetermined angle R° is repeated (refer to FIG. 20D) until, a display position is derived which does not hide the anchor, with the window "2" not deviating outside the area of the screen.

Any value is set in advance as the rotational angle R for the display direction. The display position which is derived may be any position which does not hide the anchor (i.e., in which the entire region of the anchor can still be seen), or, alternatively, may be a display position for the window in which only a portion of the anchor can still be seen.

Furthermore, if the rotational angle R is taken to be as small a value as possible, then it is possible to perform pop-up display of a considerable number of windows continuously in directions which are close to the initially set display direction (i.e., for which the angular deviation is small).

Figure 22:
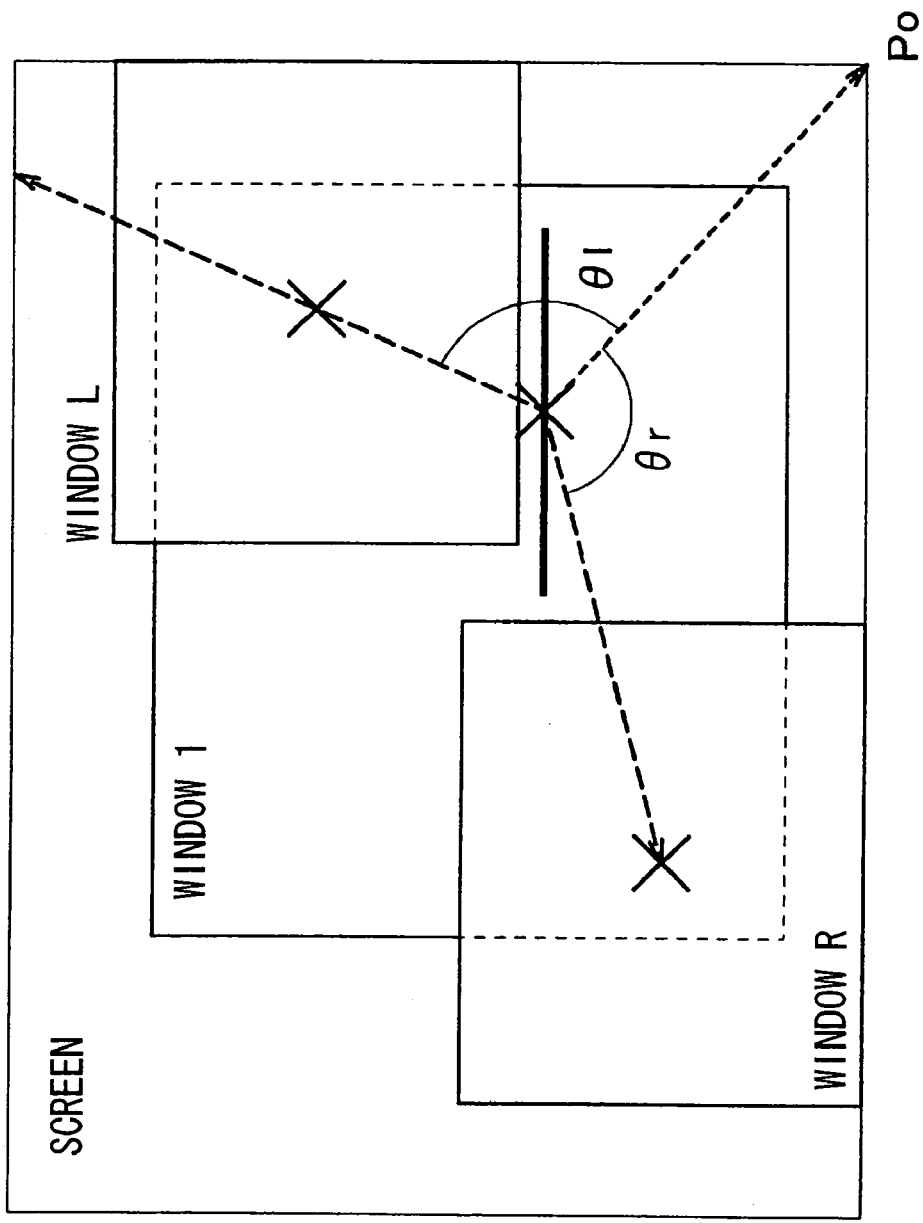
FIG. 22 is a figure for explanation of a procedural flow performed by this window display module of FIG. 17 for changing the direction of display of a pop-up window.
Figure 23:
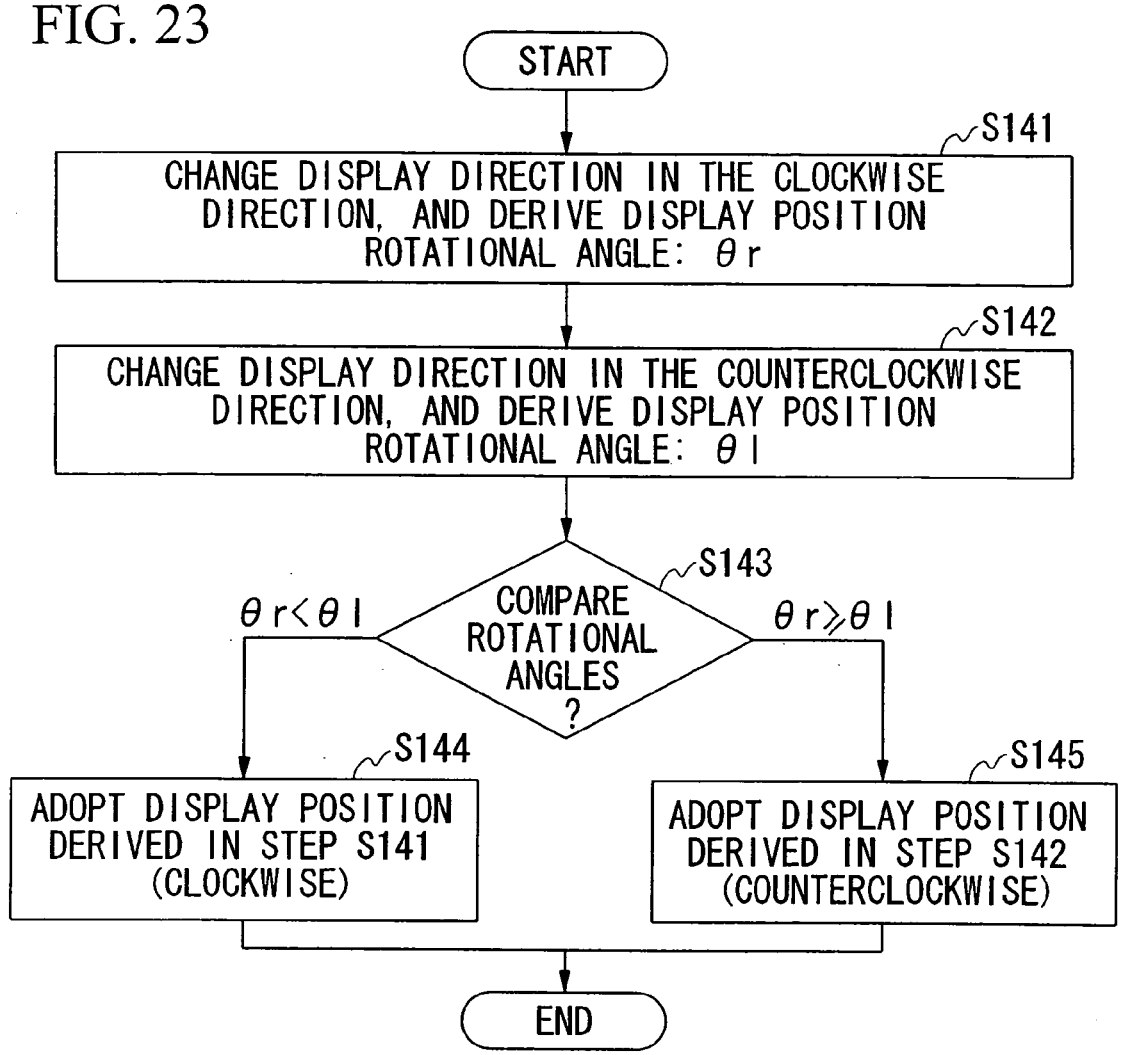
FIG. 23 is a flow chart showing this procedural flow performed by this window display module of FIG. 17 for changing the direction of display of the pop-up window.

FIG. 22 is a figure for explanation of the flow of a procedure for changing the display direction of the pop-up window, and FIG. 23 is a flow chart which shows the flow of this procedure for changing the display direction of a pop-up window.

Next, the details of the procedure which is executed if a display position for the pop-up window which satisfies the conditions has not been able to be derived (detected) in the initially set window display direction, in other words in the display direction which is set in advance in the window management table 52, will be explained in detail using the flow chart shown in FIG. 23, with reference also being made to FIGS. 21 and 22.

When changing the display direction of the pop-up window in a step S128 of FIG. 21, first, the display direction is varied in the clockwise direction, and a display position (a rotational angle $\theta r$) of the pop-up window which satisfies the conditions is derived (in a step S141).

Next, the display direction is varied in the counterclockwise direction, and a display position (a rotational angle $\theta 1$) of the pop-up window which satisfies the conditions is derived (in a step S142)

Then, the rotational angle of the display direction which has been changed in order to derive a display position of the pop-up window which satisfies the conditions is compared (in a step S143) in terms of the value (the absolute value) in the clockwise direction and in terms of the value (the absolute value) in the counterclockwise direction.

Subsequently, the display position of the pop-up window in the rotational direction for which the absolute value of the rotational angle is the smaller is adopted, and the pop-up window is displayed in this position. In other words, if the rotational angle $\theta r$ in the clockwise direction is smaller than the rotational angle $\theta 1$ in the counterclockwise direction, then the display position in the clockwise direction which was derived in the step S141 is adopted (in a step S144). In contrast, if the rotational angle $\theta r$ in the clockwise direction is greater than the rotational angle $\theta 1$ in the counterclockwise direction, then the display position in the counterclockwise direction which was derived in the step S142 is adopted (in a step S145).

Of course, it would also be acceptable to vary the display position of the pop-up window, and to adopt (to determine upon) a suitable resulting display position, without any consideration relating to rotation in the clockwise direction or rotation in the counterclockwise direction.

Although in the above it was arranged for the step S145 to be executed if the rotational angle θr and the rotational angle θ1 in FIG. 23 were equal to one another, exactly the same result as in FIG. 23 may be obtained, even if it is arranged to execute the step S144 if, in the step S143, the condition θr≦θ1 has been satisfied, while executing the step S145 if the condition θr>θ1 has been satisfied.

In this manner, if the user is continuously browsing contents, it is possible to establish a connection with the display directions of the pop-up windows in which these contents are displayed by reducing the rotational angles of the positions in which the pop-up displays are performed between the parent window, the window (the child window) which is being pop-up displayed from this parent window, and the window (the grandchild window) which is being further pop-up displayed from this child window. Furthermore, when the user is viewing pop-up windows (contents for presentation) which are being pop-up displayed continuously upon the screen, it becomes easy for him to anticipate the position of the next pop-up window which is displayed, and accordingly it becomes possible for him to browse the contents more easily by reducing the movement of his point of view which is required when viewing the contents for presentation.

It should be understood that, if it has not been possible to derive a display position for the pop-up window which satisfies the conditions even if the display direction of the pop-up window is varied (if, for example, it has not been possible to derive a display position in which the anchor is not hidden without going off the screen) then the display position of the window is determined by the following procedure.

First, the display direction of the pop-up window is varied from 0° to 360°, and a position is derived in each display direction in which the entire region of the pop-up window upon the screen is displayed.

Next, the size is calculated of the region of the anchor which, when a pop-up window is being displayed in each display position, is hidden by this pop-up window. Then, the sizes of the regions of the anchor which, according to this calculation, would be hidden by the pop-up windows, in each case, are compared, and the display position for which this hidden region size is the least is adopted as the display position for the pop-up window.

Furthermore, if the entire region of the anchor is hidden no matter where this pop-up window is displayed, it will also be acceptable to arrange to repeat the steps from S123 to S129 of FIG. 21 while reducing the size of the pop-up window stepwise by the contents presentation section 514, so as to derive a display position in which the anchor is not hidden, without going off the screen and while also displaying the entire region of the pop-up window.

Figure 24:
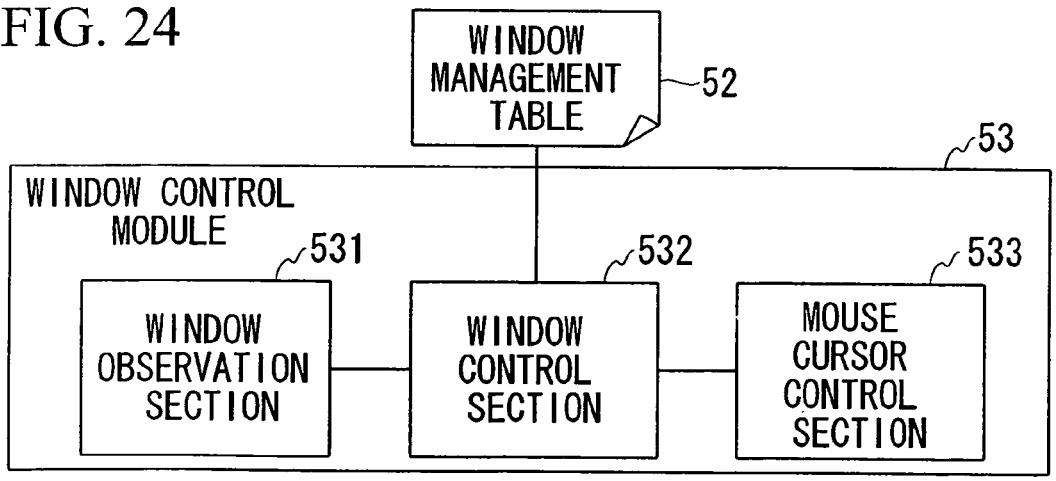
FIG. 24 is a block diagram showing the structure of the window control module of FIG. 13.

FIG. 24 is a block diagram showing the structure of the window control module 53 in this second preferred embodiment of the present invention. In this second preferred embodiment, the structure of the window control module 53 is the same as that of the window control module 53 which was shown in FIG. 8, with the exception of the feature that the window control section 532 is not connected to the window display module 51 but to the window management table 52, and of the feature that various sections which are incorporated in the window control module 53 of the first preferred embodiment are provided with certain additional functions.

Furthermore, since the overall procedural flow of the window control module 53 for pop-up window display control is the same as that in the first preferred embodiment described above, the flow chart of FIG. 9 will suffice for explanation thereof. However, in this second preferred embodiment, the details of the procedure in the step S22 of the FIG. 9 flow chart are different from the details thereof in the case of the first preferred embodiment. In detail, if the position to which the mouse cursor has been moved is outside the pop-up window (the active window), in other words when the mouse cursor has been moved to any window which are displayed ("outside window" in the step S24), then closing operation is performed (in the step S22) for the windows which have been pop-up displayed from this window which has been moved to. The details of this pop-up window closing procedure which is performed in the step S22 will be explained hereinafter.

It should be understood that in this second preferred embodiment, in the same way as with the first preferred embodiment described above, the user is enabled easily to perform continuous browsing of linked contents with the window control procedure which is performed by the window control module like that shown in FIG. 9.

Figure 25:
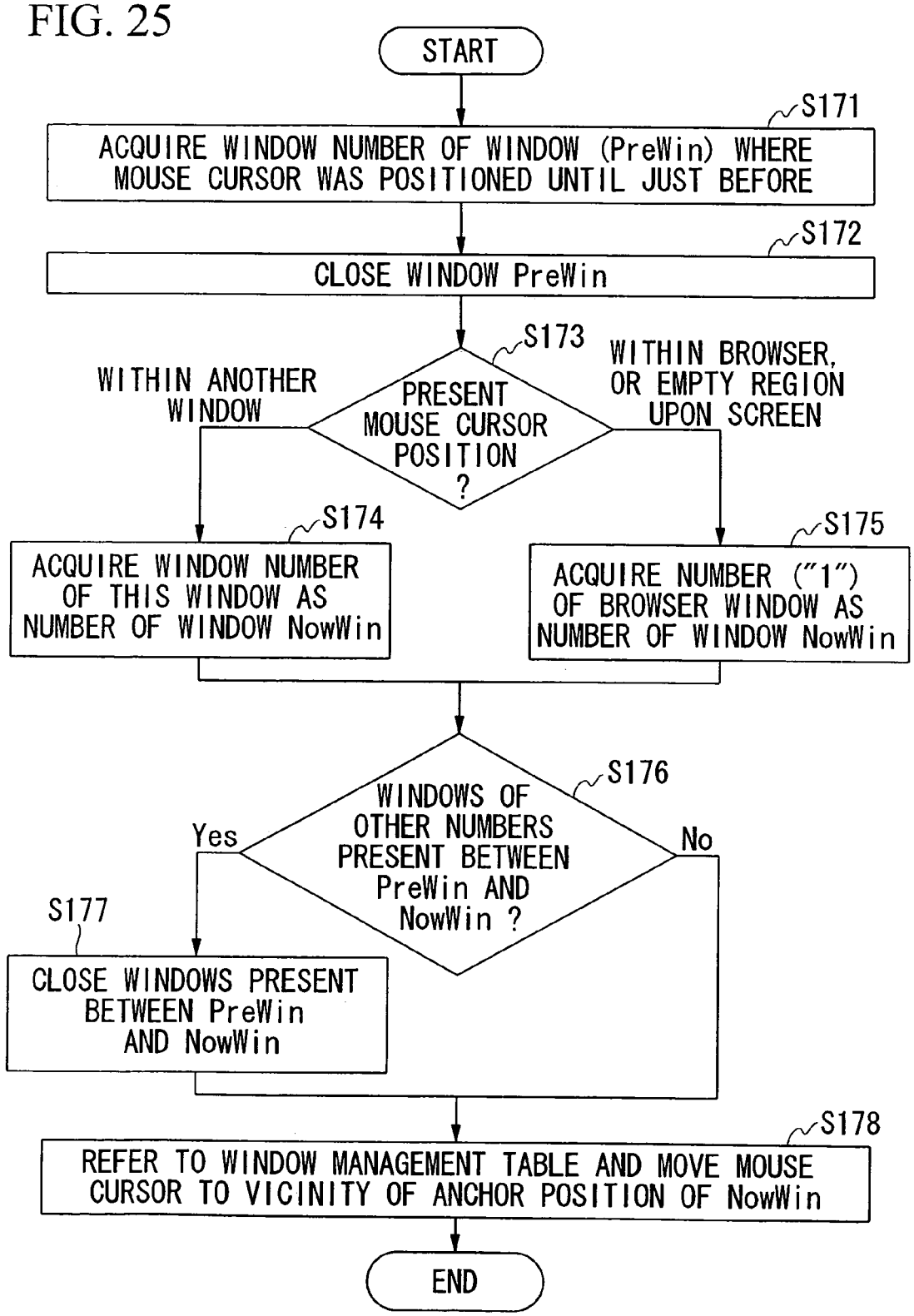
FIG. 25 is a flow chart showing the details of a procedural flow for window control which is performed in a step S22 of FIG. 9, with the second preferred embodiment of the present invention.

FIG. 25 is a flow chart showing the details of the flow of the procedure which is executed by the window control module 53 in the step S22 of FIG. 9.

In the following, the details of the flow of pop-up window closing operation in the step S22 of FIG. 9 will be explained using the flow chart shown in FIG. 25, while referring to FIG. 24.

The window observation section 531 observes mouse events which are initiated by the user, detects the fact that the mouse cursor has moved to outside the pop-up window (the active window), and, by referring to the window management table 52 (in a step S171), acquires the window number of the pop-up window (hereinafter termed PreWin) where the mouse cursor was positioned until just before.

Next, the window control section 532 closes (in a step S172) this pop-up window (PreWin), and the flow of control proceeds to a step S173.

In this step S173, the window observation section 531 finds out the present mouse cursor position, and, when the present position of the mouse cursor has been moved to any window which are displayed, it performs closing for the windows which have been pop-up displayed subsequent to this window which has been moved to. In other words, if the mouse cursor has been moved to within any window which is a parent window of the pop-up window (PreWin), or a window which is a parent window of that window, or . . . , ("within another window" in the step S173), then the window management table 52 is referred to, and the window number of this window is acquired (in a step S174) as the window number of the window (hereinafter termed NowWin) where the mouse cursor is currently located; and then the flow of control proceeds to a step S176.

It should be understood that if the mouse cursor is located within the browser window, or if it is located in an empty region upon the screen ("within browser, or empty region upon screen" in the step S173), then window number "1" of the browser is acquired as the window number of NowWin (in a step S175), and the flow of control then proceeds to the step S176.

In this step S176, the window number of PreWin which has been acquired in the step S171 and the window number of NowWin which has been acquired in the step S174 or in the step S175 are compared together, and if windows of other numbers are present between them (YES in the step S176), then these windows of window numbers between the window number of PreWin and the window number of NowWin are identified, and these windows are closed (in a step S177). On the other hand, if no windows of window numbers between the window number of the window PreWin and the window number of the window NowWin are present (NO in the step S176), then the flow of control proceeds to a step S178.

Here, existence of windows of other window numbers between the window number of PreWin and the window number of NowWin means that the mouse cursor has been moved to a pop-up window except its parent window from the pop-up window, while jumping over one or more pop-up windows which have been displayed subsequent to that pop-up window. On the other hand, non-existence of windows of other window numbers between the window number of PreWin and the window number of NowWin means that the mouse cursor has been moved from the pop-up window to its parent window.

In the step S178, the mouse cursor control section 533 refers to the window management table 52 and acquires the anchor position information which is written in "anchor position" for the window (NowWin) where the mouse cursor is currently located, and moves the mouse cursor to the vicinity of this anchor position.

Specifically, in the case of, for example, the screen shown in FIG. 19, the mouse cursor is currently present in the window "3", and, if the mouse cursor has been moved to the window "2", then the window "3" is closed (is deleted). Then, the mouse cursor moves to the vicinity of the anchor A2 of the window "2", which was the source of the link for opening the window "3".

Furthermore, if the mouse cursor is moved from the window "3" to the window "1", or to an empty region upon the screen, then the windows "2" and "3" are both closed. Then, the mouse cursor is moved to the vicinity of the anchor A1 of the window "1", which was the source of the link for opening the window "2".

In this manner, by the mouse cursor's movement to the vicinity of the anchor of the window (the parent window) which was the source of the link for opening the pop-up window, the user is enabled easily to browse the contents for presentation of the parent window again, for example, to browse the linked contents which are indicated by other anchors within the parent window.

By doing this, the user is able easily to perform browsing of linked contents continuously and recursively.

Although, in the above, a preferred example of the second preferred embodiment of the present invention has been shown and described, the present invention should not be considered as being limited to the shown and described preferred embodiment; rather, various variations to the form and the details of any preferred embodiment may be entertained, provided that the gist and the scope of the present invention are adhered to.

For example, it would be acceptable to arrange, not to close the window immediately when closing the window, but to close it after a predetermined time period has elapsed. In other words, it will be acceptable, if the mouse cursor is again returned to within the window within this predetermined time period until the window is closed, to invalidate this window closing operation. At this time, it might also be considered to provide a visual indication of the situation by making the window translucent within the predetermined period of time until the window is closed.

Furthermore, in the above explanation, a procedural flow was adopted in which, in the derivation of the display position of the pop-up window upon the screen by the display position derivation section 513, first, a position upon a straight line in a predetermined display direction is detected in which it is possible to display the entire region of the pop-up window, and with which the anchor (object) is not hidden; and, if it has not been possible to detect this type of position, then the display direction of the pop-up window is rotated (is changed) by R°, and the steps S123 through S129 of the FIG. 21 flow chart are repeated. However, it would also be acceptable to arrange matters so that, first, all the positions (regions) are detected in which it is possible to display the entire region of the pop-up window, and with which the anchor is not hidden; and then, from among these detected regions, the one which is closest to the predetermined display direction is adopted as the display position for the pop-up window.

What is claimed is:

1. A linked contents browsing support method which supports, via an object which has a linked destination, browsing of linked contents which are contents connected to the object, comprising:

a step in which a mouse event observation section observes a mouse event of a mouse cursor upon a screen of an information device by a user, and detects from the mouse event that the mouse cursor has entered into a region of the object which has the linked destination;

a step in which a window display section, when the mouse event occurs, utilizes an anchor position acquisition section to acquire a display position upon the screen of the object into the region of which the mouse cursor has entered;

a step in which the window display section utilizes a display size calculation section to acquire a display size for a window in which the object is displayed, and to calculate a display size for a new window which displays contents for presentation which correspond to the object, based upon the display size which has been acquired;

a step in which a display position derivation section takes the display position upon the screen of the object acquired by the anchor position acquisition section as an origin, and detects points upon a predetermined direction line for which, if each of the points upon the direction line is taken as a central position of the new window, the entire region of the new window is displayed upon the screen;

a step in which the display position derivation section detects, from among the points which have been detected, a point for which a window for which this point has been taken as the central position is not put upon the object;

a step in which the display position derivation section determines a display position upon the screen of the new window, based upon the point for which the window is not put upon the object;

a step in which, in response to the fact that the mouse event observation section has detected that the mouse cursor has entered into the region of the object which has the linked destination, the window display section displays the new window in the display position upon the screen which has been determined by the display position derivation section;

a step in which a linked contents acquisition section acquires linked contents which are connected to the object for which it has been detected by the mouse event observation section that the region has been entered into; and a step in which a linked contents presentation section creates contents for presentation based upon the linked contents which have been acquired, and displays the created contents for presentation within the new window which has been displayed upon the screen.

2. A linked contents browsing support method as described in claim 1, further comprising a step in which a contents processing section performs a summarizing or editing procedure of the linked contents which have been acquired by the linked contents acquisition section, based upon a contents conversion rule for summarizing or editing contents in a display format or style,
and wherein the linked contents presentation section displays the contents upon which the summarizing or editing procedure has been performed by the contents processing section within the new window as the contents for presentation.

3. A linked contents browsing support method as described in claim 2, further comprising a step of the mouse event observation section detecting the fact that the mouse cursor has been put on an object which has the linked destination, and deciding that the mouse cursor has entered into a region of an object which has the linked destination.

4. A linked contents browsing support method as described in claim 1, further comprising a step of the linked contents presentation section, in response to an action by the user with respect to the new window, utilizing a window control section to perform window control corresponding to the action.

5. A linked contents browsing support method as described in claim 4, further comprising a step of, after the contents for presentation have been displayed within the new window, the window control section, in response to a window closing request from the user, closing the new window when the mouse cursor has come to be no longer put upon the new window.

6. A linked contents browsing support method as described in claim 4, further comprising a step of the window control section, after the contents for presentation have been displayed within the new window, responding to operation of a mouse wheel by the user, and scrolling the contents for presentation which are being displayed within the new window in accordance with rotation of the wheel.

7. A linked contents browsing support method as described in claim 4, further comprising a step of the window control section, after the contents for presentation have been displayed within the new window, responding to mouse movement operation to within the new window by the user, and establishing a state in which an object which has a linked destination within the new window can be selected.

8. A linked contents browsing support method as described in claim 4, further comprising a step of the window control section, after the contents for presentation have been displayed within the new window, responding to an action by the user which has been determined upon in advance, and, along with closing all the windows in which the contents for presentation are being displayed, displays, using an application which corresponds to a data format of contents to be displayed, the contents for presentation which have been displayed within the window which the action by the user, which has been determined upon in advance, has generated or the linked contents which are the source for the contents for presentation, within a window which is newly opened upon the screen by the application.

9. A linked contents browsing support method as described in claim 4, further comprising a step of the mouse event observation section detecting the fact that the mouse cursor has been put on an object which has the linked destination, and deciding that the mouse cursor has entered into a region of an object which has the linked destination.

10. A linked contents browsing support method as described in claim 1, further comprising a step of the mouse event observation section detecting the fact that the mouse cursor has been put on an object which has the linked destination, and deciding that the mouse cursor has entered into a region of an object which has the linked destination.

11. A linked contents browsing support method as described in claim 1, further comprising a step of the linked contents presentation section, when displaying the contents for presentation within the new window, increasing or decreasing the display magnification ratio in accordance with the size of the new window.

12. A linked contents browsing support method as described in claim 1, further comprising:
a step of the window display section, when displaying the new window in the display position which has been derived by the display position derivation section, recording a window number which indicates the display order of the windows which are being displayed upon the screen in a window management table in the order of window display; and
a step of the linked contents presentation section utilizing a window control section to detect that the mouse cursor has moved from the new window which has been popped up last to within any one of the windows which are recorded in the window management table, and, based upon the window numbers which are stored in the window management table, closing the other windows, other than the window after movement, among the windows which have been displayed in order from the window after movement to the new window which has been displayed last.

13. A linked contents browsing support method as described in claim 12, wherein the window control section does not perform the window closing when the mouse cursor has returned to the window which has been popped up last, until a predetermined time period has elapsed from detecting that the mouse cursor has moved to the window after movement.

14. A linked contents browsing support method as described in claim 12, further comprising a step of the display position derivation section, if it has not been possible to detect a point for which the window is not put upon the object, shifting the predetermined direction line by a predetermined angle each time, and detecting a point upon the direction line for which the entire region of the new window is displayed upon the screen.

15. A linked contents browsing support method as described in claim 1, further comprising a step of the display position derivation section, if it has not been possible to detect a point for which the window is not put upon the object, shifting the predetermined direction line by a predetermined angle each time, and detecting a point upon the direction line for which the entire region of the new window is displayed upon the screen.

16. A linked contents browsing support method as described in claim 15, further comprising a step of the display position derivation section, if it is not possible to derive a display position in which the entire region of the new window is displayed upon the screen and the new window is not put upon the object, changing the display direction of the new window, deriving a display position in which the entire region of the new window is displayed upon the screen, and determining a display position for which the size of the region of the object which is hidden by the new window when the new window has been displayed in each of the display positions is the minimum, as the display position for the new window.

17. A linked contents browsing support method as described in claim 15, further comprising a step of the display position derivation section, if it is not possible to derive a display position in which the new window does not hide the entire region of the object, demagnifying the size of the new window in a stepwise manner, and deriving a display position in which the entire region of the new window is displayed upon the screen and the new window does not hide the object.

18. A linked contents browsing support device which supports, via an object which has a linked destination, browsing of linked contents which are contents connected to the object, comprising:
   a mouse event observation section which observes a mouse event of a mouse cursor upon a screen of an information device by a user, and detects from the mouse event that the mouse cursor has entered into a region of the object which has the linked destination;
   a window display section which responds to the fact that the mouse event observation section has detected that the mouse cursor has entered into the region of the object which has the linked destination, and displays a new window upon the screen;
   a linked contents acquisition section which acquires linked contents which are connected to the object for which it has been detected by the mouse event observation section that the region has been entered into; and
   a linked contents presentation section which creates contents for presentation based upon the linked contents which have been acquired, and displays the created contents for presentation within the new window which has been displayed upon the screen,
   wherein the window display section comprises;
   an anchor position acquisition section which, when the mouse event occurs, acquires a display position upon the screen of the object into the region of which the mouse cursor has entered;
   a display size calculation section which acquires a display size for a window in which the object is displayed, and calculates a display size for the new window which displays the contents for presentation which correspond to the object, based upon the display size which has been acquired;
   a display position derivation section which takes the display position upon the screen of the object as an origin, detects points up on a predetermined direction line for which, if each of the points upon the direction line is taken as a central position of the new window, the entire region of the new window is displayed upon the screen, detects, from among the points which have been detected, a point for which a window for which this point has been taken as the central position is not put upon the object, and determines a display position upon the screen of the new window, based upon the point for which the window is not put upon the object;
   wherein the linked contents presentation section displays the new window in the display position which has been determined by the display position derivation section.

19. A linked contents browsing support device as described in claim 18, further comprising a contents processing section which performs an summarizing or editing procedure of the linked contents which have been acquired, based upon a contents conversion rule for summarizing or editing contents in a display format or style, and wherein the linked contents presentation section displays the contents upon which the summarizing or editing procedure has been performed by the contents processing section within the new window as the contents for presentation.

20. A linked contents browsing support device as described in claim 18, wherein the linked contents presentation section comprises a window control section which responds to an action by the user with respect to the new window, and performs window control corresponding to the action.

21. A linked contents browsing support device as described in claim 18, wherein the mouse event observation section detects the fact that the mouse cursor has been put on an object which has the linked destination, and decides that the mouse cursor has entered into a region of an object which has the linked destination.

22. A computer readable recording medium upon which is recorded a linked contents browsing support program which supports, via an object which has a linked destination, browsing of linked contents which are contents connected to the object, the linked contents browsing support program causing a computer to perform the steps comprising:
   a step of making a mouse event observation section observe a mouse event of a mouse cursor upon a screen of an information device by a user, and of making the mouse event observation section detect the fact that the mouse cursor has entered into a region of the object which has the linked destination, based on the mouse event;
   a step of, when the mouse event occurs, making a window display section acquire a display position upon the screen of the object into the region of which the mouse cursor has entered, by utilizing an anchor position acquisition section;
   a step of making the window display section acquire a display size for a window in which the object is displayed by utilizing a display size calculation section, and making the window display section calculate a display size for a new window which displays contents for presentation which correspond to the object by using the display size calculation section, based upon the display size which has been acquired;
   a step of making a display position derivation section take the display position upon the screen of the object acquired by the anchor position acquisition section as an origin, and detect points upon a predetermined direction line for which, if each of the points upon the direction line is taken as a central position of the new window, the entire region of the new window is displayed upon the screen;
   a step of making the display position derivation section detect, from among the points which have been detected, a point for which a window for which this point has been taken as the central position is not put upon the object;
   a step of making the display position derivation section determine a display position upon the screen of the new window, based upon the point for which the window is not put upon the object;
   a step of, in response to the fact that the mouse event observation section has detected that the mouse cursor has entered into the region of the object which has the linked destination, making a window display section display the new window in the display position upon the screen which has been determined by the display position derivation section;

a step of making a linked contents acquisition section acquire linked contents which are connected to the object for which it has been detected by the mouse event observation section that the region has been entered into; and a step of making a linked contents presentation section create contents for presentation based upon the linked contents which have been acquired, and of making the linked contents presentation section display the created contents for presentation within the new window which has been displayed upon the screen.

23. A computer readable recording medium upon which is recorded a linked contents browsing support program as described in claim 22, the linked contents support program further causing a computer to perform a step of making a contents processing section perform a summarizing or editing procedure of the linked contents which have been acquired by the linked contents acquisition section, based upon a contents conversion rule for summarizing or editing contents in a display format or style, and wherein the linked contents presentation section is made to display the contents upon which the summarizing or editing procedure has been performed by the contents processing section within the new window as the contents for presentation.

24. A computer readable recording medium upon which is recorded a linked contents browsing support program as described in claim 22, the linked contents support program further causing a computer to perform a step of, in response to an action by the user with respect to the new window, making the linked contents presentation section perform window control corresponding to the action, by utilizing a window control section.

25. A computer readable recording medium upon which is recorded a linked contents browsing support program as described in claim 22, the linked contents support program further causing a computer to perform a step of making the mouse event observation section detect the fact that the mouse cursor has been put on an object which has the linked destination, and making the mouse event observation section decide that the mouse cursor has entered into a region of an object which has the linked destination.

26. A computer readable recording medium upon which is recorded a linked contents browsing support program which supports, via an object which has a linked destination, browsing of linked contents which are contents connected to the object, the linked contents browsing support program comprising:

a step of making a mouse event observation section observe a mouse event of a mouse cursor upon a screen of an information device by a user, and of making the mouse event observation section detect the fact that the mouse cursor has entered into a region of the object which has the linked destination, based on the mouse event;

a step of, when the mouse event occurs, making a window display section acquire a display position upon the screen of the object into the region of which the mouse cursor has entered, by utilizing an anchor position acquisition section;

a step of making the window display section acquire a display size for a window in which the object is displayed by utilizing a display size calculation section, and making the window display section calculate a display size for a new window which displays contents for presentation which correspond to the object by using the display size calculation section, based upon the display size which has been acquired;

a step of making a display position derivation section take the display position upon the screen of the object acquired by the anchor position acquisition section as an origin, and detect points upon a predetermined direction line for which, if each of the points upon the direction line is taken as a central position of the new window, the entire region of the new window is displayed upon the screen;

a step of making the display position derivation section detect, from among the points which have been detected, a point for which a window for which this point has been taken as the central position is not put upon the object;

a step of making the display position derivation section determine a display position upon the screen of the new window, based upon the point for which the window is not put upon the object;

a step of, in response to the fact that the mouse event observation section has detected that the mouse cursor has entered into the region of the object which has the linked destination, making the window display section display the new window in the display position upon the screen which has been determined by the display position derivation section;

a step of making a linked contents acquisition section acquire linked contents which are connected to the object for which it has been detected by the mouse event observation section that the region has been entered into; and a step of making a linked contents presentation section create the contents for presentation based upon the linked contents which have been acquired, and of making the linked contents presentation section display the created contents for presentation within the new window which has been displayed upon the screen.

27. A computer readable recording medium as described in claim 26, wherein the linked contents browsing support program further comprises a step of making a contents processing section perform a summarizing or editing procedure of the linked contents which have been acquired by the linked contents acquisition section, based upon a contents conversion rule for summarizing or editing contents in a display format or style, and wherein the linked contents presentation section is made to display the contents upon which the summarizing or editing procedure has been performed by the contents processing section within the new window as the contents for presentation.

28. A computer readable recording medium as described in claim 26, wherein the linked contents browsing support program further comprises a step of, in response to an action by the user with respect to the new window, making the linked contents presentation section perform window control corresponding to the action, by utilizing a window control section.

29. A computer readable recording medium as described in claim 26, wherein the linked contents browsing support program further comprises a step of making the mouse event observation section detect the fact that the mouse cursor has been put on an object which has the linked destination, and making the mouse event observation section decide that the mouse cursor has entered into a region of an object which has the linked destination.

* * * * *